US012631812B2

(12) United States Patent
Huseby et al.

(10) Patent No.: US 12,631,812 B2
(45) Date of Patent: May 19, 2026

(54) MULTILAYER OPTICAL FILM

(71) Applicant: 3M INNOVATIVE PROPERTIES COMPANY, St. Paul, MN (US)

(72) Inventors: Kevin T. Huseby, Oakdale, MN (US); Stephen A. Johnson, Woodbury, MN (US); Samuel A. Minno, St. Paul, MN (US); Lin Zhao, Woodbury, MN (US); William T. Fay, Woodbury, MN (US); Robert L. Brott, Woodbury, MN (US); Gilles J-B Benoit, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 312 days.

(21) Appl. No.: 18/548,438

(22) PCT Filed: Feb. 17, 2022

(86) PCT No.: PCT/IB2022/051436
§ 371 (c)(1),
(2) Date: Aug. 30, 2023

(87) PCT Pub. No.: WO2022/195373
PCT Pub. Date: Sep. 22, 2022

(65) Prior Publication Data
US 2024/0151889 A1     May 9, 2024

Related U.S. Application Data

(60) Provisional application No. 63/161,061, filed on Mar. 15, 2021.

(51) Int. Cl.
*G02B 5/30* (2006.01)
*G02B 5/08* (2006.01)

(52) U.S. Cl.
CPC ........... *G02B 5/305* (2013.01); *G02B 5/0841* (2013.01)

(58) Field of Classification Search
CPC ........ G02B 5/305; G02B 5/0841; G02B 5/08; G02B 5/0816; G02B 5/0825; G02B 5/28;
(Continued)

(56) References Cited

U.S. PATENT DOCUMENTS

| | | | |
|---|---|---|---|
| 3,711,176 A | 1/1973 | Alfrey, Jr. et al. | |
| 5,103,337 A | 4/1992 | Schrenk et al. | |

(Continued)

FOREIGN PATENT DOCUMENTS

| | | |
|---|---|---|
| EP | 0488544 B1 | 1/1998 |
| JP | 2009086659 A | 4/2009 |
| WO | 2013001269 A1 | 1/2013 |

OTHER PUBLICATIONS

Berreman, "Bragg Reflection of Light from Single-Domain Cholesteric Liquid-Crystal Films", Physical Review Letters, Aug. 1970, vol. 25, No. 9, pp. 577-581.

(Continued)

*Primary Examiner* — Arnel C Lavarias
(74) *Attorney, Agent, or Firm* — Clifton F. Richardson

(57) ABSTRACT

A multilayer optical film includes a plurality of optical repeat units. Each of the optical repeat units includes at least four sequentially arranged first through fourth layers including first and third layers having respective f-ratios f1 and f3. The optical film has a first order reflection band having a reflection peak height Rp1 and any second order reflection band has a reflection peak height Rp2, where Rp1/Rp2≥5. Rp1/Rp2 may remain at least 5 when changing at least one of the f-ratios f1 and f3 continuously by 0.2. A thickness of each of the second and fourth layers can be less than a thickness of each of the first and third layers by at least a (Continued)

factor of 2, or a thickness of a same one of the first and third layers can differ from a thickness of each other layer by at least a factor of 2.5.

11 Claims, 23 Drawing Sheets

(58) Field of Classification Search
CPC ........ G02B 5/281; G02B 5/282; G02B 5/285; G02B 5/287; G02B 5/30; G02B 5/3025; G02B 5/3033; G02B 5/3041; F21V 9/14; F21V 9/04
USPC ............ 359/485.03, 483.01, 485.01, 485.07, 359/489.01, 489.08, 489.11, 489.12, 359/489.13, 577, 580, 582, 584, 586, 588, 359/589, 590; 353/20; 362/19
See application file for complete search history.

(56) References Cited

U.S. PATENT DOCUMENTS

| | | | | |
|---|---|---|---|---|
| 5,360,659 A | * | 11/1994 | Arends | B32B 17/10018 |
| | | | | 359/359 |
| 5,540,978 A | | 7/1996 | Schrenk | |
| 5,783,120 A | | 7/1998 | Ouderkirk et al. | |
| 5,882,774 A | | 3/1999 | Jonza et al. | |
| 6,179,948 B1 | | 1/2001 | Merrill et al. | |
| 6,207,260 B1 | | 3/2001 | Wheatley et al. | |
| 6,590,707 B1 | | 7/2003 | Weber | |
| 6,667,095 B2 | | 12/2003 | Wheatley et al. | |
| 6,696,142 B2 | | 2/2004 | Baer et al. | |
| 6,783,349 B2 | | 8/2004 | Neavin et al. | |
| 6,967,778 B1 | | 11/2005 | Wheatley et al. | |
| 9,069,136 B2 | | 6/2015 | Weber et al. | |
| 9,162,406 B2 | | 10/2015 | Neavin et al. | |
| 9,678,252 B2 | | 6/2017 | Kivel et al. | |
| 10,001,587 B2 | | 6/2018 | Liu | |
| 2005/0141093 A1 | * | 6/2005 | Weber | G02B 5/287 |
| | | | | 359/586 |
| 2013/0215501 A1 | | 8/2013 | Hisamitsu et al. | |
| 2014/0120377 A1 | | 5/2014 | Mackerron et al. | |
| 2016/0109628 A1 | * | 4/2016 | Weber | G02B 5/0816 |
| | | | | 359/359 |
| 2019/0111666 A1 | | 4/2019 | Hebrink et al. | |
| 2019/0369314 A1 | | 12/2019 | Hebrink et al. | |

OTHER PUBLICATIONS

International Search report for PCT International Application No. PCT/IB2022/051436, mailed on Apr. 26, 2022, 3 pages.

* cited by examiner

2nd order, nA = 1.494, nB = 1.766, nC = 1.494

1st order, nA = 1.4994, nB = 1.766, nC = 1.494

MULTILAYER OPTICAL FILM

CROSS REFERENCE TO RELATED APPLICATIONS

This application is a national stage filing under 35 U.S.C. 371 of PCT/IB2022/051436, filed Feb. 17, 2022, which claims the benefit of U.S. Application No. 63/161,061, filed Mar. 15, 2021, the disclosures of which are incorporated by reference in their entirety herein.

BACKGROUND

A multilayer optical film can include a stack of polymeric layers arranged into optical repeat units. The multilayer optical film can be a reflective polarizer or a mirror.

SUMMARY

The present description relates generally to multilayer optical films having a first order reflection band disposed at wavelengths greater than about 600 nm or greater than about 700 nm. The optical film can include a plurality of optical repeat units, where each optical repeat unit includes at least four individual layers. The optical repeat units may be configured such that a second order harmonic of the first order reflection band is suppressed.

In some aspects of the present description, a multilayer optical film including a plurality of optical repeat units is provided. The optical repeat units in the plurality of optical repeat units number greater than about 10 in total. Each of the optical repeat units can include at least four sequentially arranged first through fourth individual layers. For each of the optical repeat units, the first and third individual layers can have respective f-ratios f1 and f3 for respective indices of refraction nx1 and nx3 in a same in-plane x-direction, such that for a substantially normally incident light polarized along the x-direction, the multilayer optical film has a first order reflection band disposed at wavelengths greater than about 600 nm. The first order reflection band has a first reflection peak having a peak height Rp1 and any second order reflection band of the multilayer optical film has a reflection peak having a peak height Rp2. The ratio Rp1/Rp2 may be at least 5 and may remain at least 5 when changing at least one of the f-ratios f1 and f3 continuously by 0.2. In some embodiments, for each of the optical repeat units, an average thickness of each of the second and fourth individual layers is less than an average thickness of each of the first and third individual layers by at least a factor of 2. In some embodiments, for each of the optical repeat units, an average thickness of a same one of the first and third individual layers differs from an average thickness of each other layer of the first through fourth individual layers by at least a factor of 2.5.

In some aspects of the present description, a multilayer optical film including a plurality of optical repeat units is provided. The optical repeat units in the plurality of optical repeat units number greater than about 10 in total. Each of the optical repeat units includes at least four individual layers. First and second individual layers in the at least four individual layers of each of the optical repeat units having respective f-ratios f1 and f2 for respective indices of refraction in a same in-plane x-direction. In some embodiments, 0.5≤f1≤0.8 and 0.02≤f2≤0.3, such that for a substantially normally incident light polarized along the x-direction, the multilayer optical film has a first order reflection band disposed at wavelengths greater than about 700 nm, and at least no second order reflection band. At least a third layer in the at least four individual layers of each of the optical repeat units may have an average thickness of less than about 75 nm.

These and other aspects will be apparent from the following detailed description. In no event, however, should this brief summary be construed to limit the claimable subject matter.

DETAILED DESCRIPTION

Figure 1A:
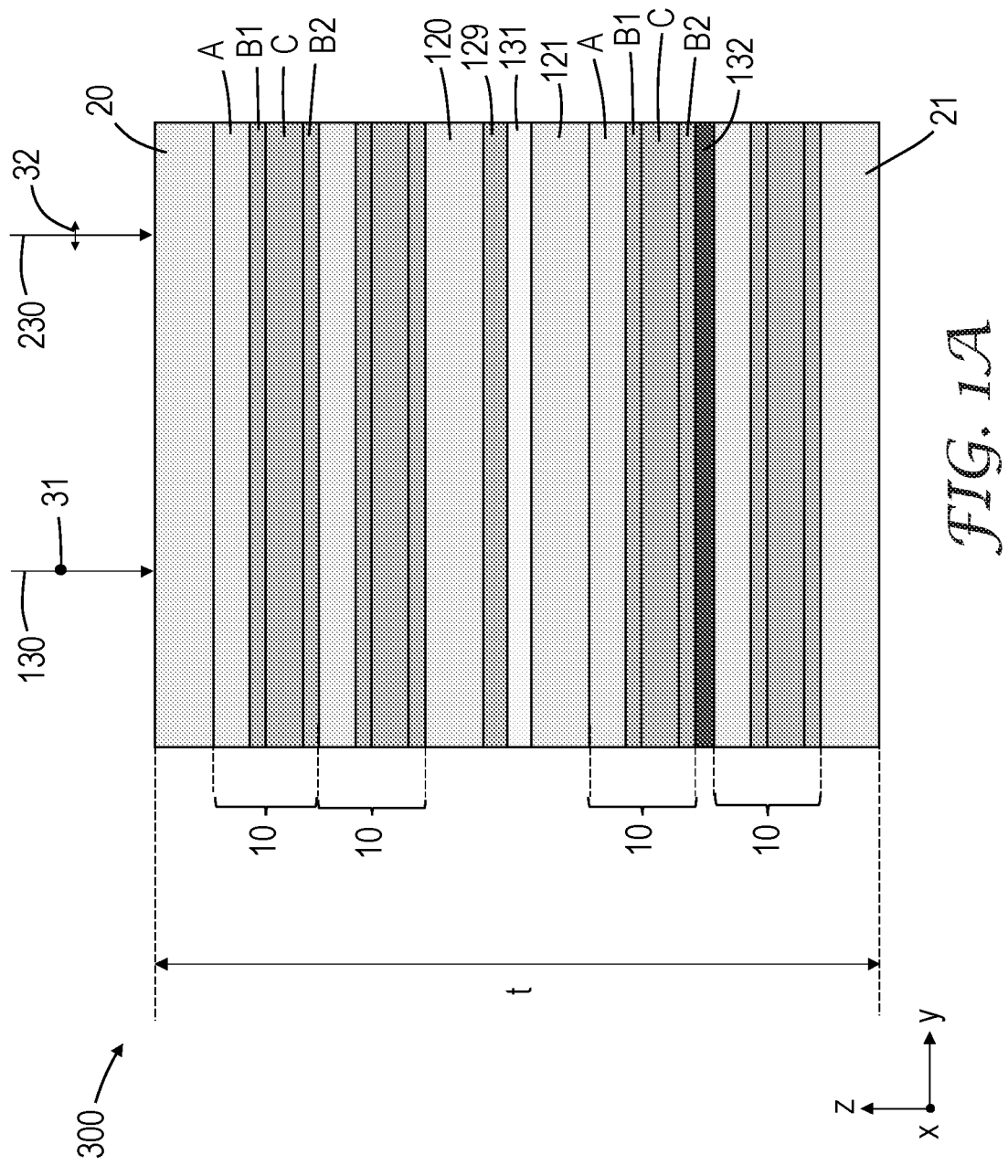
FIG. 1A is a schematic cross-sectional view of an optical film, according to some embodiments.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Multilayer optical films including alternating polymeric layers can be used to provide desired reflection and transmission in desired wavelength ranges by suitable selection of layer thicknesses and refractive index differences as generally described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. The alternating polymeric layers typically include alternating high and low index layers which can be described as optical layers that transmit and reflect light primarily by optical interference. A multilayer optical film including alternating high and low index layers can be described as including a plurality of optical repeat units where each optical repeat unit includes a high index layer and a low index layer. An optical repeat unit is generally the smallest distinct unit of optical layers that repeats along a thickness direction of the optical film. Each optical repeat unit may include one or more layers in addition to the high and low index layers as described in U.S. Pat. No. 5,103,337 (Schrenk et al.); U.S. Pat. No. 5,540,978 (Schrenk) and U.S. Pat. No. 6,207,260 (Wheatley et al.), for example.

In some cases, it may be desired for the optical film to have a reflection band disposed at wavelengths greater than about 600 nm or greater than about 700 nm and, in some cases, up to about 1300 nm or up to about 1200 nm, while providing a high optical transmittance for wavelengths in a visible wavelength range of about 420 nm to at least about 600 nm, for example. Such optical films may be useful as window films for reducing infrared heating, for example. However, when a primary (first order) near infrared reflection band is provided, there can be second order or higher order harmonics of the reflection band present in the visible wavelength range. Accordingly, it may be desired to suppress or eliminate second and sometimes higher order reflection bands. The strength of the second and higher order harmonics is a function of the f-ratio(s) of the optical film as generally described in U.S. Pat. No. 9,678,252 (Kivel et al.), for example, for a two-layer optical repeat unit. The f-ratio of a layer of an optical repeat unit is the optical thickness of the layer divided by the optical thickness of the optical repeat unit, where the optical thickness of each layer of the optical repeat unit is the thickness of the layer multiplied by an index of refraction of the layer along a same in-plane direction and the optical thickness of the optical repeat unit is the sum of the optical thickness for each of the layers. Except where specified differently, the wavelength used in determining the index of refraction is about 633 nm. For an optical film utilizing an n-layer optical repeat unit, there are n−1 independent f-ratios that can be specified since the sum of the f-ratios for the layers of the optical repeat unit is unity. An optical film having a near infrared reflection band and including a plurality of optical repeat units, where each optical repeat unit includes 4 layers being in sequence, an A layer, a B layer, a C layer, and another B layer, can have a suppressed second and third order harmonic of the infrared reflection band when a refractive index of the B layers is the geometric mean of the refractive indices of the A and C layers and when the f-ratio for the A and C layer are each ⅓ and the f-ratio of each of the B layers is ⅙. However, using B layers having a refractive index being the geometric mean of the refractive indices of the A and C layers can undesirably restrict the materials that can be chosen for the various layers. According to some aspects of the present description, multilayer optical films providing a robust suppression of at least the second order harmonic are described which utilize f-ratios for A and C layers substantially different from ⅓ and/or utilize refractive indices substantially different from the geometric mean of the A and C layers.

According to some aspects of the present description, it has been found that for conventional multilayer optical films that attempt to suppress the second order harmonic, the suppression is sensitive to the variations of the f-ratios that can occur across a width and/or a length of the optical film due to ordinary manufacturing variations, for example. This can lead to some regions of the optical film having an undesirably low suppression of the second and/or higher order harmonics. According to some embodiments of the present description, an optical film has specified f-ratios that result in substantial suppression (e.g., a ratio of a first order reflection peak height to any second order reflection peak height can be at least 5) of at least the second order harmonic (e.g., the second order harmonic or each of the second and third order harmonics) at the specified f-ratios and when at least one of the f-ratios changes continuously by 0.2 or more. This can substantially reduce or eliminate regions of the optical film that have an undesirably low suppression of the second and/or higher order harmonics due to manufacturing variations, for example. In some embodiments, this is achieved, for example, by using an f-ratio for one of the A and C layers in a range of 0.5 to 0.8, or in another range described elsewhere herein, and using an f-ratio for the other of the A and C layers in a range of 0.02 to 0.3, or in another range described elsewhere herein. Furthermore, according to some embodiments of the present description, it has been found that materials can be chosen for the layers of each optical repeat unit to result in a desired, robust suppression of the second and/or higher order harmonics and to result in a desired interlayer adhesion (e.g., at least about 14 grams per inch when measured at a 90 degree peel angle). For example, it has been found that A and C layers that would otherwise have poor bonding to one another can be used in the optical film when the B layers are chosen to have good bonding to each of the A and C layers to result in the optical film having a desired interlayer adhesion.

Figure 1B:
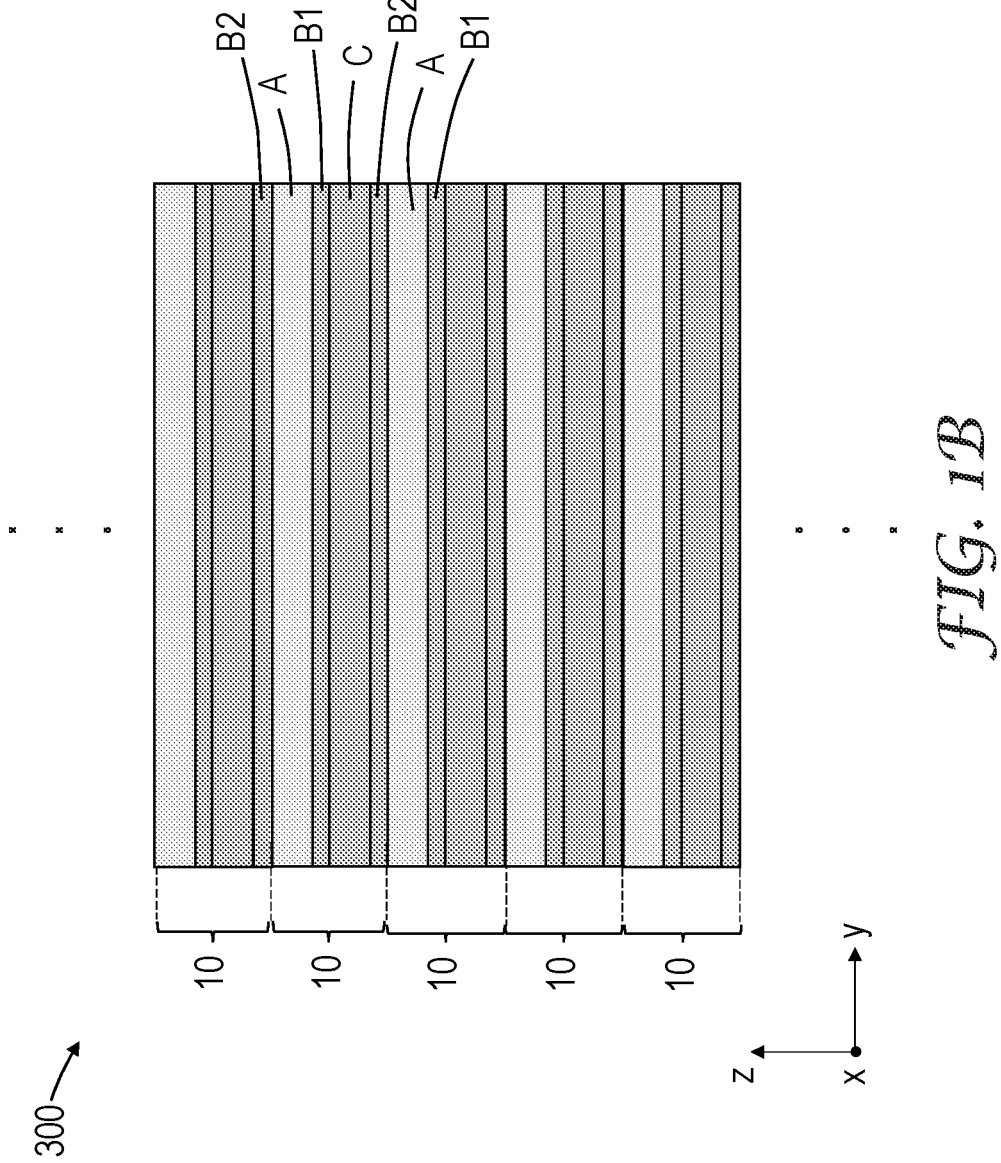
FIG. 1B is a schematic cross-sectional view of a portion of an optical film, according to some embodiments.
Figure 1C:
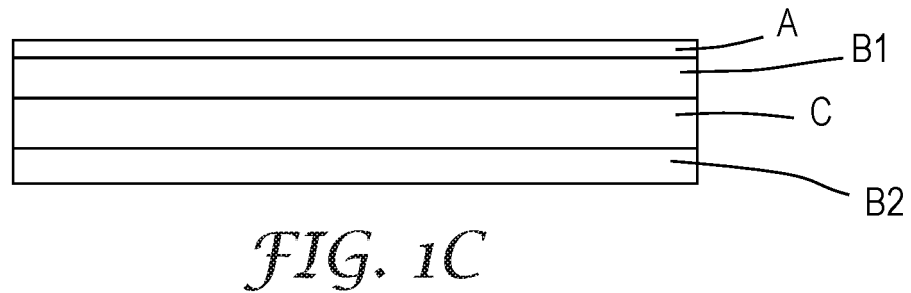
FIGS. 1C-1F are schematic cross-sectional views of optical repeat units of an optical film, according to some embodiments.
Figure 1D:
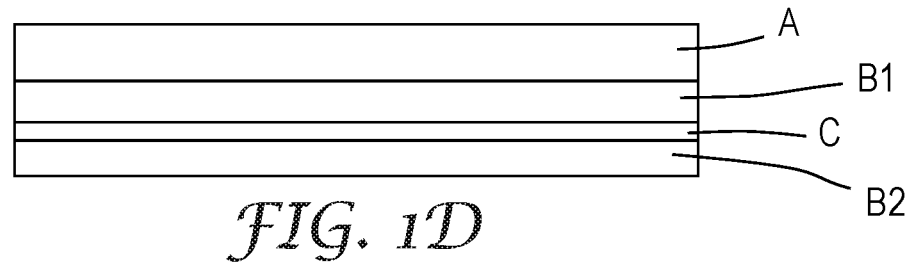
Figure 1E:
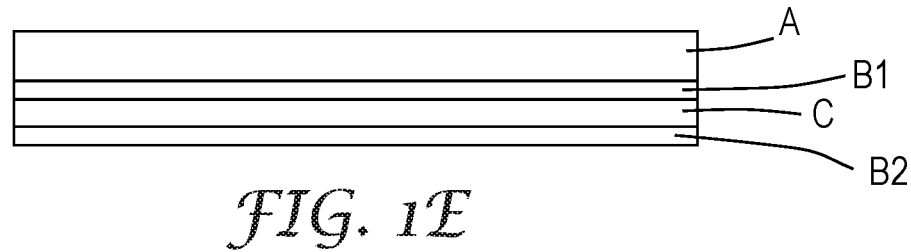
Figure 1F:
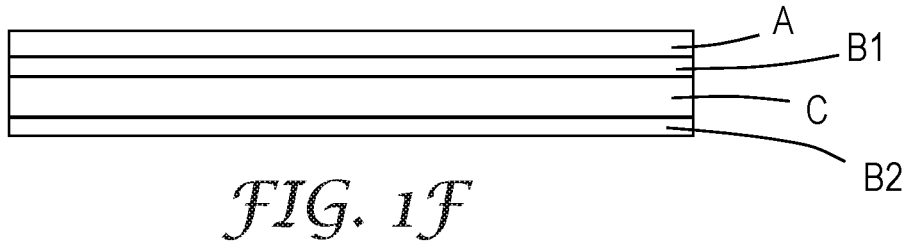

FIG. 1A is a schematic cross-sectional view of a multilayer optical film 300, according to some embodiments. The optical film 300 may be adapted to selectively reflect and transmit light based on wavelength and/or polarization state. The optical film 300 may be a reflective polarizer or an optical mirror, for example. The optical film 300 includes a plurality of optical repeat units 10 where each optical repeat unit 10 includes at least 4 individual layers. In the illustrated embodiment, the at least four individual layers include an A layer, a B1 layer, a C layer, and a B2 layer. The optical film 300 may include many more optical repeat units 10 than schematically illustrated in FIG. 1A. FIG. 1B is a schematic cross-sectional view of a portion of a multilayer optical film 300, according to some embodiments, indicating a larger number of optical repeat units 10. Each of the B1 and B2 layers may be substantially thinner than each of the A and C layers as schematically illustrated in FIGS. 1A-1B. In other embodiments, one of the A and C layers maybe substantially thinner than each of the other layers in the optical repeat unit 10 as schematically illustrated in FIGS. 1C-1D, or one of the A and C layers maybe substantially thicker than each of the other layers in the optical repeat unit 10 as schematically illustrated in FIGS. 1E-1F, or one of the A and C layers may be substantially thinner than the other of the A and C layers and substantially thicker than the B1 and B2 layers (e.g., the C layer of FIG. 1E maybe substantially thinner than the A layer and substantially thicker than the B1 and B2 layers).

In some embodiments, a multilayer optical film 300 includes a plurality of optical repeat units 10 disposed between first 20 and second 21 skin layers where each optical repeat unit includes at least one polymeric A layer, at least two B layers (e.g., at least a B1 layer and a B2 layer), and at least one polymeric C layer. Each pair of adjacent A and C layers can have at least one of the two B layers disposed therebetween. In some embodiments, each of the B layers is a polymeric layer. A total number of the A and C layers in the plurality of optical repeat units disposed between the first and second skin layers 20 and 21 can be less than about 400. For example, the total number of the A and C layers can be in a range of about 10 or about 20 to about 400 or to about 350. The total number of optical repeat units in the plurality of optical repeat units refers to the total number of distinct optical repeat units (no layer of the film is in more than one distinct optical repeat unit). In some embodiments, a multilayer optical film 300 includes a plurality of optical repeat units where the optical repeat units in the plurality of optical repeat units number, for example, less than about 200, or less than about 175, or less than about 150, or less than about 130, or less than about 120, or less than about 115, or less than about 110, or less than about 105, or less than about 100, or less than about 95, or less than about 90 in total. The total number of optical repeat units in the plurality of optical repeat units can be at least about 10, or at least about 15, or at least about 20, or at least about 25, or at least about 30, or at least about 40, or at least about 50, or at least about 60, or at least about 70, or at least about 75, for example. The plurality of optical repeat units can have a combined average thickness of less than about 22 micrometers, or less than about 20 micrometers, or less than about 19 micrometers, or less than about 18 micrometers, or less than about 17 micrometers, or less than about 16 micrometers, for example. The combined average thickness of the optical repeat units can be greater than about 5 micrometers or greater than about 10 micrometers, for example.

In some embodiments, each optical repeat unit 10 is defined by four individual layers (e.g., A, B1, C, B2). In other words, in some embodiments, each optical repeat unit 10 includes only four individual layers. In other embodiments, each optical repeat unit 10 includes more than four individual layers.

In some embodiments, each of the A, B1, B2, and C layers can have an average thickness of at least about 0.5 nm, or at least about 1 nm, or at least about 2 nm, or at least about 3 nm, or at least about 5 nm or at least about 10 nm and no more than about 500 nm, or no more than about 400 nm, or no more than about 300 nm. For example, each of the A, B, and C layers can have an average thickness of between about 1 nm and about 500 nm, or between about 5 nm and about 400 nm, or between about 10 nm and about 300 nm. In some embodiments, at least one layer (e.g., at least one of the B1 or B2 layers) in the at least four individual layers of each of the optical repeat units has an average thickness of less than about 75 nm, or less than about 60 nm, or less than about 50 nm, or less than about 40 nm, or less than about 30 nm, or less than about 20 nm, or less than about 15 nm, or less than about 10 nm, or less than about 7.5 nm. In some such embodiments, or in other embodiments, each layer of the at least one layer has an average thickness of at least about 0.5 nm, or at least about 1 nm, or at least about 2 nm, or at least about 3 nm.

In some embodiments, a multilayer optical film 300 includes a plurality of optical repeat units 10, where the optical repeat units in the plurality of optical repeat units can number greater than about 10 in total, or can be in any range described elsewhere herein, and where each of the optical repeat units includes at least four sequentially arranged first through fourth individual layers. The first through fourth individual layers may be sequentially labeled in the plus or minus z-direction of FIG. 1B, for example, and the starting (first) layer may be, for example, an A layer or a C layer. For example, A, B1, C, B2 may be identified as an optical repeat unit including sequentially arranged first through fourth individual layers; or A, B2, C, B1 may be identified as an optical repeat unit including sequentially arranged first through fourth individual layers; or C, B2, A, B1 may be identified as an optical repeat unit including sequentially arranged first through fourth individual layers; or C, B1, A, B2 may be identified as an optical repeat unit optical repeat unit including sequentially arranged first through fourth individual layers. In some embodiments (see, e.g., FIG. 8), for each of the optical repeat units 10, an average thickness of each of the second (e.g., B1) and fourth (e.g., B2) individual layers is less than an average thickness of each of the first (e.g., one of the A and C layers) and third (e.g., the other of the A and C layers) individual layers by at least a factor of 2, or at least a factor of about 2.25, or at least a factor of about 2.5, or at least a factor of about 2.75, or at least a factor of about 3, or at least a factor of about 3.25, or at least a factor of about 3.5. In some such embodiments, or in other embodiments, for each of the optical repeat units 10, an average thickness of each of the second (e.g., B1) and fourth (e.g., B2) individual layers is less than an average thickness of each of the first (e.g., one of the A and C layers) and third (e.g., the other of the A and C layers) individual layers by a factor of up to about 20, or up to about 15, or up to about 10, or up to about 8, or up to about 6, or up to about 5, for example. In some embodiments (see, e.g., FIGS. 6, 11, 13, 16 and 18) for each of the optical repeat units 10, an average thickness of a same one of the first and third individual layers (e.g., one of the A and C layers) differs from an average thickness of each other layer (e.g., the other of the A and C layers, and each of the B1 and B2 layers) of the first through fourth individual layers by at least a factor of 2, or at least a factor of about 2.25, or at least a factor of about 2.5, or at least a factor of about 2.75, or at least a factor of about 3, or at least a factor of about 3.25, or at least a factor of about 3.5. In some such embodiments, or in other embodiments, for each of the optical repeat units 10, an average thickness of a same one of the first and third individual layers (e.g., one of the A and C layers) differs from an average thickness of each other layer (e.g., the other of the A and C layers, and each of the B1 and B2 layers) of the first through fourth individual layers by a factor of up to about 20, or up to about 15, or up to about 10, or up to about 8, or up to about 6, or up to about 5, for example. The same one of the first and third individual layers may have an average thickness greater than each other layer of the first through fourth individual layers, or the same one of the first and third individual layers may have an average thickness less than each other layer of the first through fourth individual layers, or the same one of the first and third individual layers may have an average thickness less than some of the other layer(s) of the first through fourth individual layers and greater than the remaining layer(s) of the first through fourth individual layers.

In some embodiments, each of the first and second skin layers 20 and 21 has an average thickness of greater than about 500 nm, or greater than about 750 nm, or greater than about 1000 nm, or greater than about 1250 nm, or greater than about 1500 nm. In some such embodiments, or in other embodiments, each of the first and second skin layers 20 and 21 has an average thickness less than about 8 micrometers, or less than about 5 micrometers, or less than about 4 micrometers. The optical film 300 may include additional layers, such as protective boundary layers 120, 121 that are used to protect packets of optical repeat units as is known in the art, or such as additional layers 129, 131 disposed between protective boundary layers 120, 121 or additional layer(s) 132 between optical repeat units. The additional layers 129, 131, 132, if included, can each have an average thickness of less than about 500 nm or the average thickness can be in any range described for any of the A, B1, B2, or C layers. The protective boundary layers 120, 121, if included, can each have an average thickness in a range of about 500 nm or about 750 nm to about 2 micrometers, for example. In some embodiments, the optical film 300 has an average thickness t of less than about 28 micrometers, or less than about 26 micrometers, or less than about 24 micrometers, or less than about 22 micrometers, or less than about 20 micrometers, or less than about 19 micrometers, or less than about 18 micrometers, or less than about 17 micrometers, for example. In some such embodiments, or in other embodiments, the average thickness t is greater than about 5 micrometers, or greater than about 10 micrometers, or greater than about 12 micrometers, for example. The average thickness t may be described as the combined average thickness of the optical repeat units plus the average thickness of the skin layers 20, 21 plus the average thickness of any additional layers (e.g., 120, 121, 129, 131, 132) that may be included.

In some embodiments, the second and fourth individual layers (e.g., the B1 and B2 layers) have a same composition. In other embodiments, the second and fourth individual layers have a different composition. In some embodiments, for each optical repeat unit in the optical film 300 or for each optical repeat unit in at least a majority of the optical repeat units of the optical film 300, the second and fourth individual layers (e.g., the B1 and B2 layers) in the optical repeat unit have a substantially same thickness (e.g., the B1 and B2 layers in the optical repeat unit can have a thickness within 10% of each other or within 5% of each other). The substantially same average thickness for the second and fourth individual layers in a first optical repeat unit may be substantially different from the substantially same average thickness for the second and fourth individual layers in a different second optical repeat unit. In some embodiments, for each optical repeat unit in at least a majority of the optical repeat units of the optical film 300, the second and fourth individual layers in the optical repeat unit have different thicknesses. The first and third individual layers (e.g., the A and C layers) can have a same composition or a different composition. In some embodiments, for each optical repeat unit in the optical film 300 or for each optical repeat unit in at least a majority of the optical repeat units of the optical film 300, the A and C layers have a same composition and have substantially different thicknesses (e.g., thickness differ by greater than 10%). In some embodiments, the A and C layers have different compositions.

In some embodiments, the optical film 300 is integrally formed. As used herein, a first element "integrally formed" with a second element means that the first and second elements are manufactured together rather than manufactured separately and then subsequently joined. Integrally formed includes manufacturing a first element followed by manufacturing the second element on the first element. An optical film including a plurality of layers is integrally formed if the layers are manufactured together (e.g., combined as melt streams and then cast onto a chill roll to form a cast film having each of the layers, and then orienting the cast film) rather than manufactured separately and then subsequently joined.

Substantially normally incident (e.g., with 30, or 20, or 10, or 5 degrees of normal incidence) light 130 and 230 incident on the optical film 300 are schematically illustrated in FIG. 1A. Light 130 has a polarization state 31 (polarized along the in-plane x-direction) and light 230 has an orthogonal polarization state 32 (polarized along the in-plane y-direction). In some embodiments, a multilayer optical film 300 has a reflection band in a predetermined wavelength range (e.g., any of the infrared wavelength ranges described elsewhere herein) for a substantially normally incident light 130 polarized along the x-direction. In some embodiments, the multilayer optical film 300 is an optical mirror also having a reflection band in the predetermined wavelength range for a substantially normally incident light 230 polarized along the y-direction. In some embodiments, the multilayer optical film 300 is a reflective polarizer having an average optical transmittance in the predetermined wavelength range for a substantially normally incident light 230 polarized along the y-direction of at least about 70% or at least about 80%.

Suitable materials for the various layers in the multilayer optical film 300 include, for example, polyethylene naphthalate (PEN), coPEN (copolyethylene naphthalate terephthalate copolymer), polyethylene terephthalate (PET), polyhexylethylene naphthalate copolymer (PHEN), glycol-modified PET (PETG), glycol-modified PEN (PENG), syndiotactic polystyrene (sPS), THV (a terpolymer of tetrafluoroethylene, hexafluoropropylene and vinylidene fluoride), polymethyl methacrylate (PMMA), coPMMA (a copolymer of methyl methacrylate and ethyl acrylate), styrenic block copolymers (block copolymers including styrene blocks) such as linear triblock copolymers based on styrene and ethylene/butylene, acrylic block copolymers (block copolymers including acrylate or methacrylate blocks) such as a linear triblock copolymers based on methyl methacrylate and n-butyl acrylate, anhydride-modified ethylene vinyl acetate polymers, ketone ethylene ester terpolymers, polyolefin thermoplastic elastomer, or blends thereof. For example, in some embodiments, each A layer comprises PEN, each B layer comprises PETG, and each C layer comprises PMMA or coPMMA. As another example, in some embodiments, each A layer comprises PETG, each B layer comprises PEN, and each C layer comprises PMMA or coPMMA. As still another example, in some embodiments, each A layer comprises PMMA or coPMMA, each B layer comprises PEN, and each C layer comprises PMMA or coPMMA. As still another example, in some embodiments, each A layer comprises PEN, each B layer comprises coPEN, and each C layer comprises PMMA or coPMMA.

Atactic polystyrene (aPS) can optionally be blended with sPS (e.g., at about 5 to about 30 weight percent aPS) to adjust the refractive indices of the resulting layer and/or to reduce the haze of the layer (e.g., by reducing a crystallinity of the layer). Suitable THV polymers are described in U.S. Pat. Appl. Pub. No. 2019/0369314 (Hebrink et al.), for example, and include those available under the DYNEON THV tradename from 3M Company (St. Paul, MN). In some embodiments, THV can contain about 35 to about 75 mole percent tetrafluoroethylene, about 5 to about 20 mole percent hexafluoropropylene, and about 15 to about 55 mole percent vinylidene fluoride. Suitable styrenic block copolymers include KRATON G1645 and KRATON G1657 available from KRATON Polymers (Houston, TX). Suitable acrylic block copolymers include those available under the KURARITY tradename from Kuraray Co., Ltd. (Tokyo, JP). PETG can be described as PET with some of the glycol units of the polymer replaced with different monomer units, typically those derived from cyclohexanedimethanol. PETG can be made by replacing a portion of the ethylene glycol used in the transesterification reaction producing the polyester with cyclohexanedimethanol, for example. Suitable PETG copolyesters include GN071 available from Eastman Chemical Company (Kingsport, TN). PEN and coPEN can be made as described in U.S. Pat. No. 10,001,587 (Liu), for example. Low melt PEN is a coPEN including about 90 mole percent naphthalene dicarboxylate groups based on total carboxylate groups and is also known as coPEN 90/10. Another useful coPEN is coPEN 70/30 which includes about 70 mole percent naphthalene dicarboxylate groups and about 30 mole percent terephthalate dicarboxylate groups based on total carboxylate groups. More generally, coPEN Z/100-Z may be used where coPEN Z/100-Z includes Z mole percent naphthalene dicarboxylate groups (typically greater than 50 mole percent and no more than about 90 mole percent) and 100-Z mole percent terephthalate dicarboxylate groups based on total carboxylate groups. Glycol-modified polyethylene naphthalate (PENG) can be described as PEN with some of the glycol units of the polymer replaced with different monomer units and can be made by replacing a portion of the ethylene glycol used in the transesterification reaction producing the polyester with cyclohexanedimethanol, for example. PHEN can be made as described for PEN in U.S. Pat. No. 10,001,587 (Liu), for example, except that a portion of the ethylene glycol (e.g., about 40 mole percent) used in the transesterification reaction is replaced with hexanediol. Suitable PET can be obtained from Nan Ya Plastics Corporation, America (Lake City, SC), for example. Suitable sPS can be obtained from Idemitsu Kosan Co., Ltd. (Tokyo, Japan), for example. Suitable PMMA can be obtained from Arkema Inc., Philadelphia, PA., for example. Suitable anhydride-modified ethylene vinyl acetate polymers include those available from Dow Chemical (Midland, MI) under the BYNEL tradename, for example. Suitable ketone ethylene ester terpolymers include those available from Dow Chemical (Midland, MI) under the BYNEL tradename, for example. Suitable polyolefin thermoplastic elastomers include those available from Mitsui Chemicals (Tokyo, Japan) under the ADMER tradename.

In some embodiments, each optical repeat unit 10 includes at least one fluoropolymer layer. Fluoropolymers (e.g., THV) may be used in a near infrared reflecting film for, example, for their stability against ultraviolet light and/or for their low refractive index, for example, as described in U.S. Pat. Appl. Pub. Nos. 2019/0369314 (Hebrink et al.) and 2019/0111666 (Hebrink et al.), for example. In some embodiments, at least one layer of each optical repeat unit has a refractive index in at least one direction of no more than 1.4 at a wavelength of 633 nm. In some embodiments, at least one layer of each optical repeat unit has a refractive index of no more than 1.4 at a wavelength of 633 nm in each of three mutually orthogonal directions. In other embodiments, the optical repeat unit 10 does not include a fluoropolymer layer. In some embodiments, each layer of each optical repeat unit has a refractive index in at least one direction of at least 1.45 at a wavelength of 633 nm. In some embodiments, each layer of each optical repeat unit has a refractive index of at least 1.45 at a wavelength of 633 nm in each of three mutually orthogonal directions.

In some embodiments, each optical repeat unit 10 includes at least one birefringent thermoplastic polymer layer. In some such embodiments, or in other embodiments, each optical repeat unit 10 includes at least one substantially isotropic (e.g., maximum difference in refractive indices in any two mutually orthogonal directions less than about 0.03, or less than about 0.02, or less than about 0.01) thermoplastic polymer layer. The at least one birefringent thermoplastic polymer layer may be biaxially or uniaxially oriented. In some embodiments, the at least one birefringent thermoplastic polymer layer includes at least one positively birefringent (birefringence increases along stretch direction) thermoplastic polymer layer. In some such embodiments, or in other embodiments, the at least one birefringent thermoplastic polymer includes at least one negatively birefringent (birefringence decreases along stretch direction) thermoplastic polymer layer. PEN, PET, and PHEN are examples of positively birefringent thermoplastic polymers, while sPS is an example of a negatively birefringent thermoplastic polymer. As described in U.S. Pat. No. 9,069,136 (Weber et al.), for example, whether a polymer will exhibit positive or negative birefringence can depend on the geometry of crystallites formed when the polymer is oriented. Suitable positively birefringent thermoplastic polymers include those forming crystallites having a symmetry axis substantially aligned with a stretch direction, while suitable negatively birefringent thermoplastic polymers include those forming crystallites having discotic unit cell structure with the smallest unit cell dimension substantially aligned with a stretch direction. Styrenic block copolymers, PMMA, coPMMA, THV, acrylic block copolymer, coPEN, and PETG are examples of thermoplastic polymers that can be substantially isotropic after orientation. Substantially isotropic polymers typically either substantially do not form crystallites when oriented or form crystallites that are melted out when a film containing the polymer is heat set. Further examples of positively and negatively birefringent thermoplastic polymers and of isotropic thermoplastic polymers, are described in U.S. Pat. No. 9,069,136 (Weber et al.), for example. Other suitable materials for the various layers in the multilayer optical film 300 include those described in U.S. Pat. No. 5,103,337 (Schrenk et al.); U.S. Pat. No. 5,540,978 (Schrenk); U.S. Pat. No. 5,882,774 (Jonza et al.); U.S. Pat. No. 6,179,948 (Merrill et al.); U.S. Pat. No. 6,207,260 (Wheatley et al.); U.S. Pat. No. 6,783,349 (Neavin et al.); U.S. Pat. No. 6,967,778 (Wheatley et al.); U.S. Pat. No. 9,069,136 (Weber et al.); and U.S. Pat. No. 9,162,406 (Neavin et al.), for example.

Figure 2:
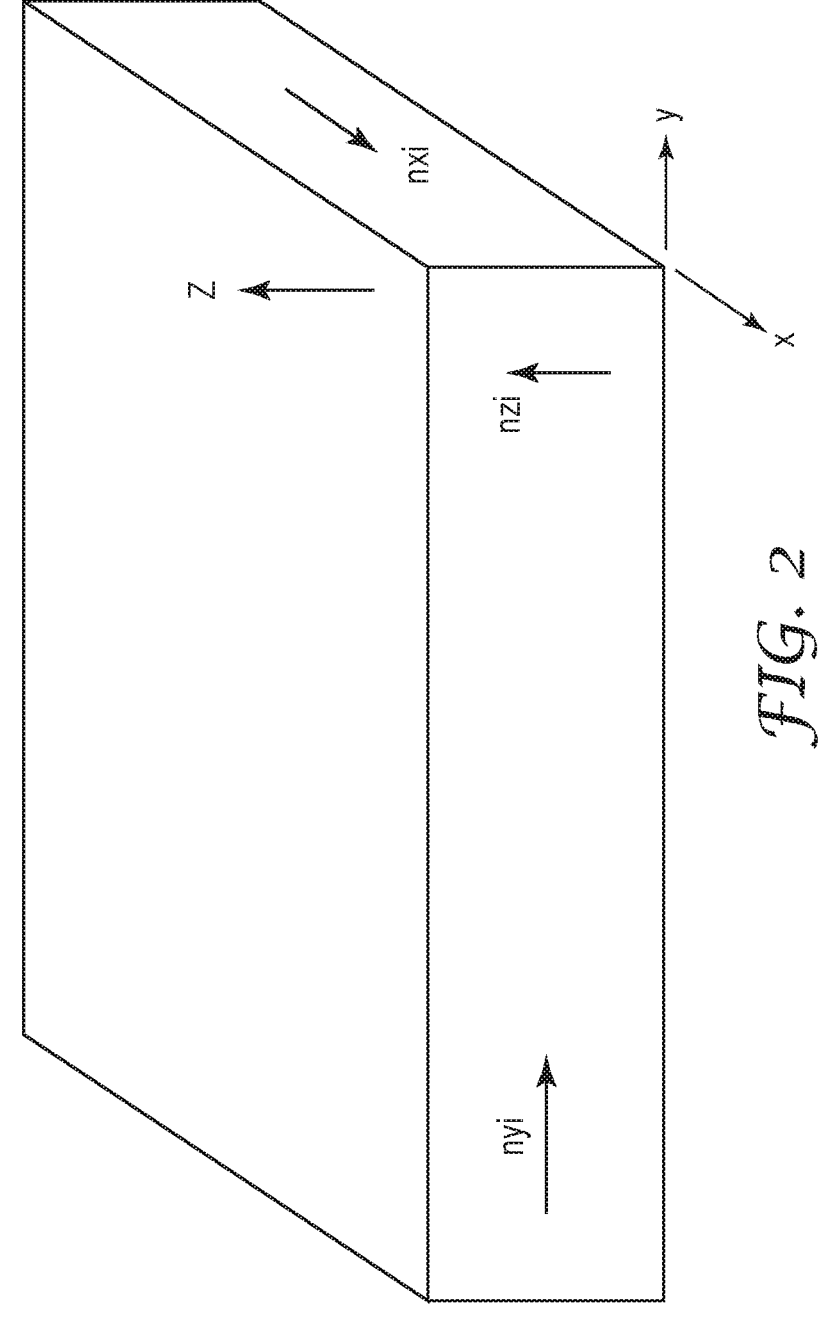
FIG. 2 is a schematic perspective view of an illustrative layer of an optical film.

Various layers of the optical film 300 may be characterized by their indices of refraction in a first in-plane direction (e.g., x-direction), an orthogonal second in-plane direction (e.g., y-direction) and/or along a thickness direction (z-direction) orthogonal to the in-plane directions. In embodiments where indices of refraction for multiple layers are specified, the indices of refraction along the x-, y-, and z-directions may be denoted $nx_i$, $ny_i$, $nz_i$, respectively, with "i" being the layer number (e.g., 1, 2, etc.) which may depend on how the layers or numbered (e.g., sequentially, or otherwise). FIG. 2 is a schematic perspective view of a layer of a multilayer optical film. Indices of refraction nxi, nyi, nzi along x-, y-, and z-directions are indicated for a layer "i" which may correspond, for example, to any of layers A, B1, C, B2 illustrated in FIGS. 1A-1F. For example, in some embodiments, a multilayer optical film 300 includes a plurality of optical repeat units 10 where each of the optical repeat units includes at least four individual layers (e.g., A, B1, C, B2) and where at least first (e.g., one of A and C) and second (e.g., the other of A and C) individual layers in the at least four individual layers of each of the optical repeat units have respective indices of refraction nx1 and nx2 along a same in-plane x-direction, respective indices of refraction ny1 and ny2 along an in-plane y-direction orthogonal to the x-direction, and respective indices of refraction nz1 and nz2 along a z-direction orthogonal to the x- and y-directions. The optical thicknesses and the f-ratios of the various layers can be determined from the indices of refraction as described further elsewhere herein. The f-ratios of the various layers in an optical repeat unit may be denoted fi where the index "i" is the layer number. The f-ratios for specific layers may be denoted $f_A$ or $f_C$, for example, for the respective A and C layers. In some embodiments, each of the optical repeat units 10 includes at least four individual layers (e.g., A, B1, C, B2), where first (e.g., one of A and C) and second (e.g., the other of A and C) individual layers in the at least four individual layers of each of the optical repeat units having respective f-ratios f1 and f2 for respective indices of refraction in a same in-plane x-direction. In some embodiments, each of the optical repeat units include at least four sequentially arranged first through fourth individual layers. In some embodiments, for each of the optical repeat units 10, the first (e.g., one of A and C) and third (e.g., the other of A and C) individual layers have respective f-ratios f1 and f3 for respective indices of refraction nx1 and nx3 in a same in-plane x-direction.

The following table lists refractive indices at a wavelength of about 633 nm for various exemplary materials that may be used for layers of the optical film 300, according to some embodiments. Birefringent materials are typically uniaxially oriented for reflective polarizers and biaxially oriented for optical mirrors. Materials such as styrenic block copolymer, THV, PMMA, coPMMA, acrylic block copolymer, coPEN, and PETG are typically isotropic regardless of whether other layers in the multilayer optical film are biaxially or uniaxially oriented. For example, a multilayer optical film including layers of such materials can be heat set at a temperature above the glass transition temperature of the material used in these layers to result in isotropic layers. Layers of some materials (e.g., PHEN) may be uniaxially oriented, biaxially oriented, or isotropic depending on stretch conditions and heat set temperature. For example, PHEN layers may be biaxially or uniaxially oriented, or PHEN layers may be heat set above the glass transition temperature of PHEN to result in isotropic layers even after the layers have been uniaxially or biaxially stretched.

| Material | Orientation | nx | ny | nz |
|---|---|---|---|---|
| PEN | Uniaxial | 1.85 | 1.60 | 1.50 |
| PEN | Biaxial | 1.7661 | 1.7379 | 1.4917 |
| sPS | Uniaxial | 1.51 | 1.62 | 1.62 |
| sPS | Biaxial | 1.57 | 1.57 | 1.62 |
| PET | Uniaxial | 1.68 | 1.58 | 1.51 |
| PET | Biaxial | 1.6720 | 1.6466 | 1.4927 |
| PET | Isotropic | 1.574 | 1.574 | 1.574 |
| PHEN | Uniaxial | 1.83 | 1.59 | 1.51 |
| PHEN | Biaxial | 1.71 | 1.71 | 1.51 |

12

-continued

| Material | Orientation | nx | ny | nz |
|---|---|---|---|---|
| PHEN | Isotropic | 1.62 | 1.62 | 1.62 |
| Styrenic Block Copolymer | Isotropic | 1.49 | 1.49 | 1.49 |
| THV | Isotropic | 1.36 | 1.36 | 1.36 |
| PMMA | Isotropic | 1.49 | 1.49 | 1.49 |
| coPMMA | Isotropic | 1.49 | 1.49 | 1.49 |
| Acrylic Block Copolymer | Isotropic | 1.48 | 1.48 | 1.48 |
| coPEN | Isotropic | 1.60 | 1.60 | 1.60 |
| PETG | Isotropic | 1.56 | 1.56 | 1.56 |

In some embodiments, each individual layer of each optical repeat unit has a refractive index in each of the x-, y-, and z-directions in a range of about 1.3 to about 1.9. In some embodiments, each individual layer of each optical repeat unit has a maximum difference in refractive index for any two of the x-, y-, and z-directions of less than about 0.4, or less than about 0.36. In some embodiments, a maximum difference in refractive index of the individual layers in an optical repeat unit along each of the x-, y-, and z-directions is less than about 0.55, or less than about 0.5, or less than about 0.45. In some embodiments, a maximum difference in refractive index of the individual layers in an optical repeat unit along a same direction (e.g., one of the x-, y-, and z-directions) is greater than about 0.05, or greater than about 0.07, or greater than about 0.1, or greater than about 0.15, or greater than about 0.2, or greater than about 0.22, or greater than about 0.25.

Figure 3:
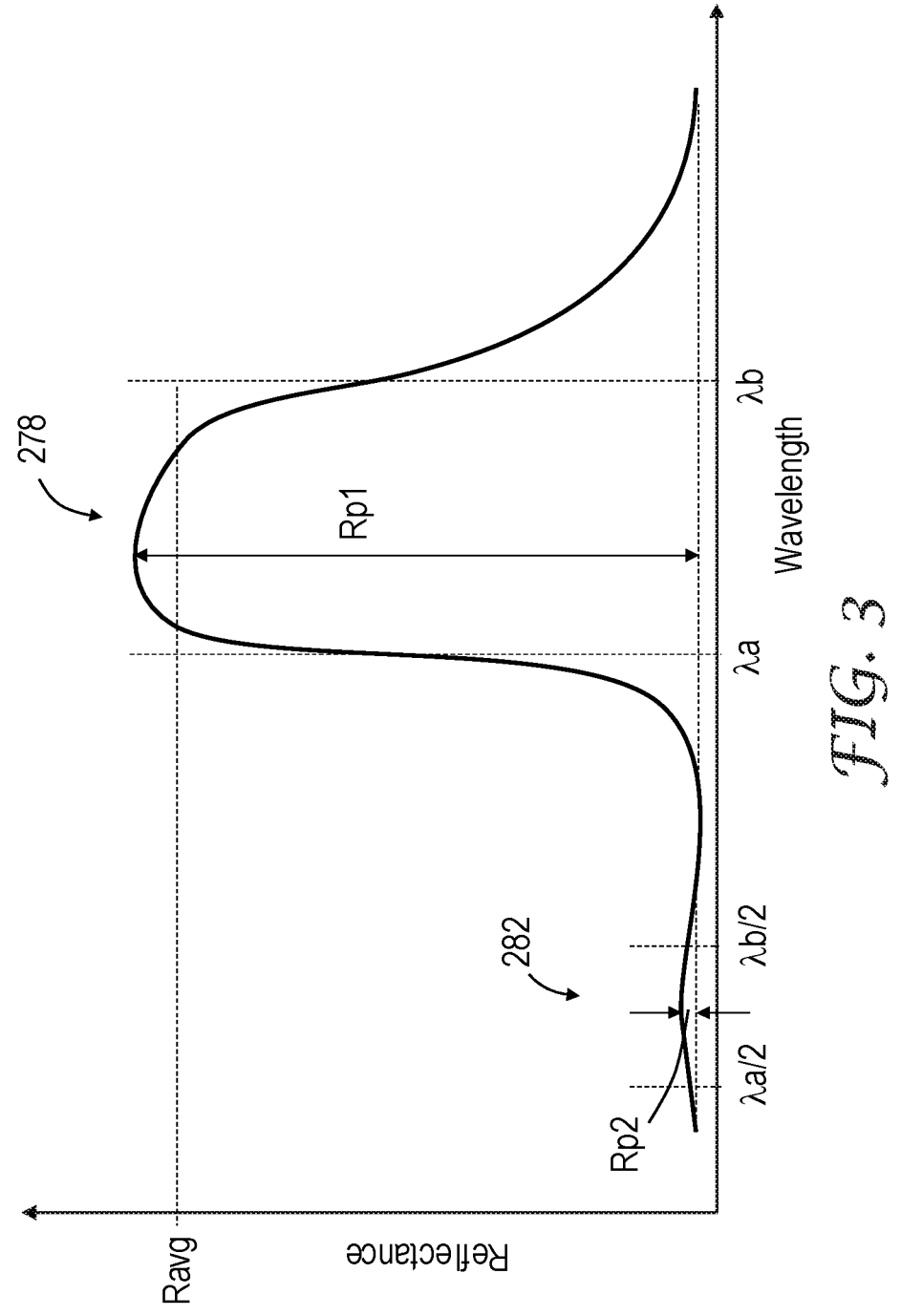
FIG. 3 is a schematic plot of optical reflectance versus wavelength for an optical film, according to some embodiments.

FIG. 3 is a schematic plot of reflectance of a multilayer optical film 300 for substantially normally incident light 130 for at least one polarization state 31, according to some embodiments. The reflectance has a first order reflection band 278 in a wavelength range of λa to λb where λa may be in a range of about 600 nm to about 1000 nm and λb may be in a range of about 1100 nm to about 1300 nm, for example. In some embodiments, the multilayer optical film 300 is an optical mirror having a substantially same reflectance for substantially normally incident light 130, 230 for the mutually orthogonal polarization states 31 and 32. In some embodiments, the multilayer optical film 300 is a reflective polarizer having a reflectance for substantially normally incident light 230 having the second polarization state 32 of less than about 20%, for example, throughout a visible wavelength range of 450 nm to 680 nm and/or through an infrared wavelength range of 800 nm to 1200 nm, for example.

Figure 4:
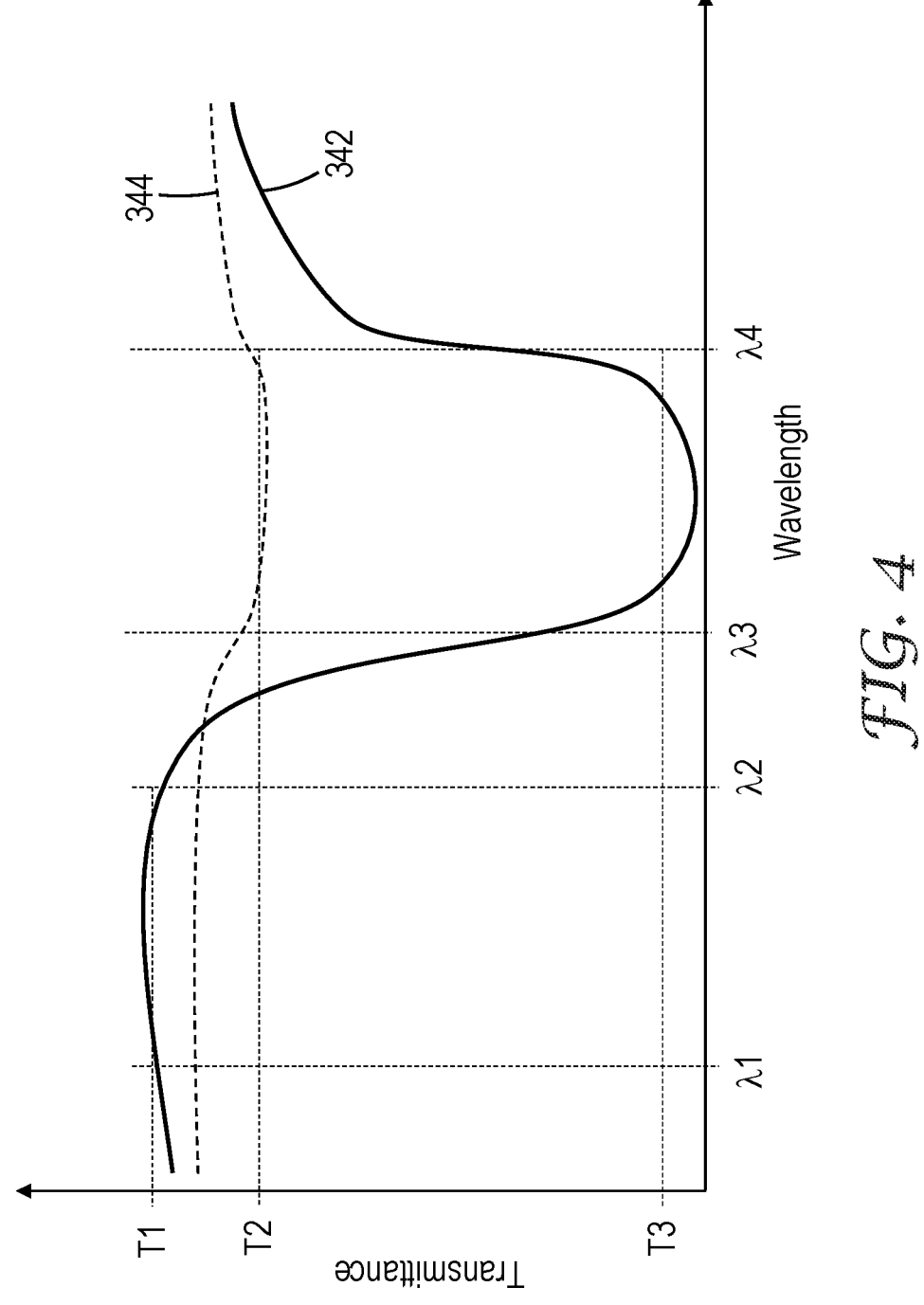
FIG. 4 is a schematic plot of optical transmittance versus wavelength for an optical film, according to some embodiments.

FIG. 4 is a schematic plot of transmittances of a multilayer optical film 300 for substantially normally incident light 130, 230, according to some embodiments. The transmittance 342 is for substantially normally incident light 130 polarized along the x-direction. In the case of an optical mirror, the transmittance 342 can also be the transmittance for substantially normally incident light 230 polarized along the y-direction. In the case of a reflective polarizer, the transmittance 344 can be the transmittance for substantially normally incident light 230 polarized along the y-direction. An average optical transmittance T1 in a wavelength range of λ1 to λ2 is indicated for the transmittance 342 and average optical transmittances T2 and T3 in a wavelength range of λ3 to λ4 are indicated for the respective transmittances 344 and 342. In some embodiments, for the substantially normally incident light 130 polarized along the x-direction, the multilayer optical film 300 has an average optical transmittance (e.g., T1) in a visible wavelength range from about 450 nm to about 680 nm of at least about 70% and an average optical reflectance (e.g., Ravg; see, e.g., FIG. 3) in an infrared wavelength range from about 1000 nm to about 1150 nm of at least about 40%. For example, in FIG. 4, $\lambda 1$ through $\lambda 4$ may be about 450 nm, about 680 nm, about 1000 nm, and about 1150 nm, respectively, while $\lambda a$ and $\lambda b$ of FIG. 3 may be about 1000 nm and about 1150 nm, respectively. The average optical reflectance Ravg can be about 100% minus the average optical transmittance (e.g., T3) in the same wavelength range (neglecting optical absorption, which is typically less than 2% or less than 1%). In some embodiments, the average optical transmittance T1 is at least about 75%, or at least about 80%, or at least about 85%. In some embodiments, the average optical reflectance Ravg is at least about 50%, or at least about 60%, or at least about 70%, or at least about 80%. In some embodiments, for a substantially normally incident light 230 polarized along an in-plane y-direction orthogonal to the x-direction, the multilayer optical film 300 has an average optical transmittance (e.g., T1) in the visible wavelength range of at least about 70% and an average optical reflectance (e.g., Ravg) in the infrared wavelength range of at least about 40%. The average optical transmittance and reflectance for the substantially normally incident light 230 polarized along the in-plane y-direction may be in any of the ranges described for the respective average optical transmittance and reflectance for the substantially normally incident light 130 polarized along the in-plane x-direction. In some embodiments, for a substantially normally incident light 230 polarized along an in-plane y-direction orthogonal to the x-direction, the multilayer optical film 300 has an average optical transmittance (e.g., T1) in the visible wavelength range of at least about 70% and an average optical transmittance (e.g., T2) in the infrared wavelength range of at least about 60%, or least about 70%, or at least about 80%.

In some embodiments, for a substantially normally incident light 130 polarized along the x-direction, the multilayer optical film 300 has a first order reflection band 278 disposed at wavelengths greater than about 600 nm or greater than about 700 nm. For example, the wavelength $\lambda a$ illustrated in FIG. 3 can be greater than about 600 nm or greater than about 700 nm. The first order reflection band 278 may be disposed, for example, at wavelengths less than about 2000 nm, or less than about 1500 nm, or less than about 1400 nm, or less than about 1300 nm. For example, the wavelength $\lambda b$ illustrated in FIG. 3 may be less than about 2000 nm, or less than about 1500 nm, or less than about 1400 nm, or less than about 1300 nm. In some embodiments, the first order reflection band 278 may be disposed in a wavelength range from 600 nm or 700 nm to 2000 nm or to 1400 nm, for example. In some embodiments, the first order reflection band 278 has a first reflection peak having a peak height Rp1, where any second order reflection band 282 of the multilayer optical film 300 has a reflection peak having a peak height Rp2. The peak height of the reflection peak refers to the largest reflectance in the reflection band relative to a baseline reflectance which may be taken to be an average of the reflectance in regions on opposite sides of the reflection band (see, e.g., FIG. 7). The first order reflection band 278 has a first reflection peak having a peak height Rp1 and may have additional smaller second reflection peak(s) (e.g., due to oscillations in the reflectance; see, e.g., FIG. 7). The baseline reflectance may be primarily due to Fresnel reflectance from outermost major surface(s) of the optical film. In some embodiments, Rp1/Rp2$\geq$5, or Rp1/Rp2$\geq$8, or Rp1/Rp2$\geq$10, or Rp1/Rp2$\geq$15, or Rp1/Rp2$\geq$20, or Rp1/Rp2$\geq$30, or Rp1/Rp2$\geq$40, or Rp1/Rp2$\geq$50. In some embodiments, Rp1 is at least about 50%, or at least about 60%, or at least about 70%, or at least about 80%, or at least about 85%. In some embodiments, Rp2 is less than about 10%, or less than about 5%, or less than about 3%, or less than about 2%.

The optical film 300 may be characterized by how Rp1/Rp2 would vary if the f-ratios of the optical film were changed from their actual values. In some embodiments, the ratio Rp1/Rp2 remains at least 5, or at least 8, or at least 10, or at least 15, or at least 20 when changing at least one of the f-ratios f1 and f3 continuously by 0.2 (e.g., continuously changing f1 from its value in the optical film to its value plus 0.2 or to its value minus 0.2). In some embodiments, the ratio Rp1/Rp2 remains at least 5 when changing at least one of the f-ratios f1 and f3 continuously by 0.3, or 0.4, or 0.5, or 0.6. In some embodiments, the ratio Rp1/Rp2 remains at least 8, or at least 10, or at least 15, or at least 20 when changing at least one of the f-ratios f1 and f3 continuously by 0.3, or 0.4, or 0.5, or 0.6. In some embodiments, the ratio Rp1/Rp2 remains at least 5, or at least 8, or at least 10, or at least 15, or at least 20 when changing at least one of the f-ratios f1 and f3 continuously by at least 0.2, or at least 0.3, or at least 0.4, or at least 0.5, or at least 0.6. The ratio Rp1/Rp2 may remain up to about 500, or up to about 200, or up to about 100, or up to about 50, for example. In some such embodiments, the at least one of the f-ratios f1 and f3 can be changed continuously by up to 0.9, or up to 0.8, or up to 0.7, for example, while Rp1/Rp2 remains in any of these ranges. Except where indicated otherwise, changing at least one of the f-ratios f1 and f3 means changing at least one of the f-ratios f1 and f3 while holding an optical thickness of each optical repeat unit constant, where the optical thickness of each optical repeat unit is a sum of optical thicknesses of each of the individual layers of the optical repeat unit, and the optical thickness of each of the individual layers is a thickness of the individual layer times an index of refraction of the individual layer along the same in-plane x-direction. The f-ratios of the second and fourth layers (B1 and B2 layers) can be kept at the same ratio to one another when changing at least one of the f-ratios f1 and f3. For example, in some embodiments, each of the optical repeat units includes at least four sequentially arranged first through fourth individual layers having respective f-ratios f1 through f4 for respective indices of refraction nx1 through nx4 in a same in-plane x-direction, and f2/f4 is held constant when continuously changing at least one of the f-ratios f1 and f3. In some embodiments, f2/f4 is about 1.

The change in Rp1/Rp2 when changing at least one of the f-ratios f1 and f3 can be determined by measuring the thicknesses of the various layers of the optical film using atomic force microscopy (AFM), for example, and determining the materials used in the various layers via standard chemical analysis techniques, for example. The refractive indices of the layers can be determined from the materials of the layers and the orientation of the film (e.g., uniaxial or biaxial) which can be determined from the transmission spectra of the film. A series of new films can then be physically made or optically modeled using standard optical modeling techniques where each new film differs from the original film by changing at least one of f1 and f3. This allows a plot (e.g., a one-dimensional plot or a contour plot) of Rp1/Rp2 versus a change in at least one of the f-ratios to be produced, from which a maximum shift in f-ratio for a given minimum desired ratio of Rp1/Rp2, for example, can be determined. Since the plot can be generated using standard optical modeling techniques from measurements of the layer thickness profiles, material properties of the layers, and transmission spectra of an optical film, the maximum continuous change in f-ratio for a given minimum desired ratio of Rp1/Rp2 for the optical film can be calculated based on these measurements. A suitable optical modeling technique can include, for example, using the 4×4 stack code of Berreman and Scheffer, Phys. Rev. Lett. 25, 577 (1970) to determine transmission and reflection spectra. A description of this method is given in the book "Ellipsometry and Polarized Light" written by Azzam and Bashara, published by Elsevier Science, Holland.

Figure 5:
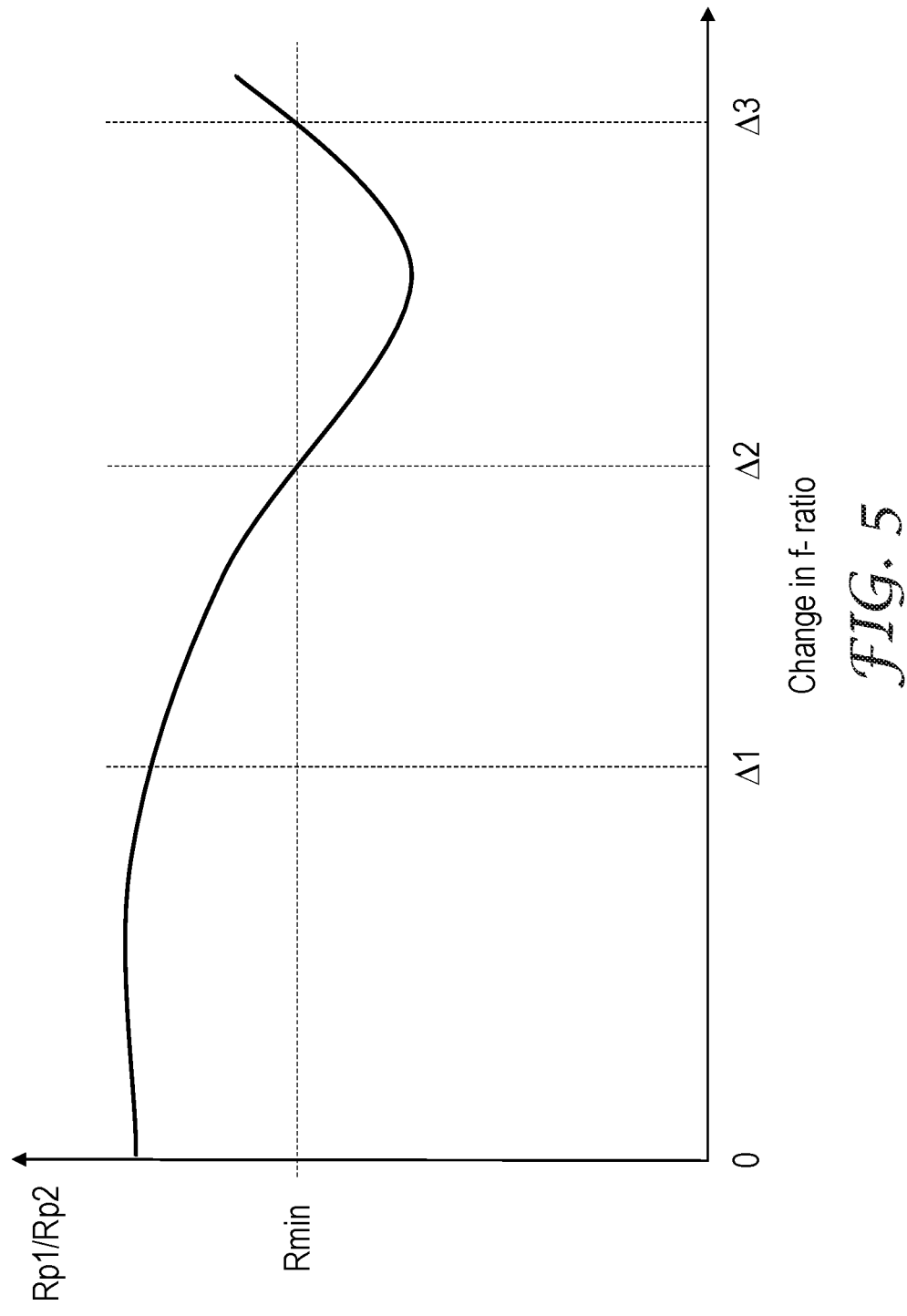
FIG. 5 is a schematic plot of a ratio of a first order reflection peak to a second order reflection peak versus change in f-ratio, according to some embodiments.

FIG. 5 is a schematic plot of Rp1/Rp2 versus change in f-ratio, according to some embodiment. A zero change in f-ratio is indicated, corresponding to the f-ratio of the optical film 300. A minimum desired ratio (Rmin) of Rp1/Rp2 is indicated. Rmin may be at least 5, at least 8, or at least 10, or at least 15, or at least 20, for example. A first change in f-ratio Δ1 is indicated. Δ1 may be a typical largest shift in f-ratio expected due to manufacturing variations, for example. The ratio Rp1/Rp2 is at least Rmin for continuous changes in f-ratio of no more than a second change in f-ratio Δ2 which is greater than the first change in f-ratio Δ1. In some embodiments, Δ2 is at least 0.2, or at least 0.3, or at least 0.4, or at least 0.5, or at least 0.6, for example. In some embodiments, changing at least one of the f-ratios f1 and f3 continuously by at least Δ2 includes monotonically increasing or monotonically decreasing at least one of the f-ratios by at least Δ2. In some cases, the ratio Rp1/Rp2 may increase above Rmin for a change in f-ratio greater than a third change in f-ratio Δ3>Δ2. However, any continuous change in f-ratio to arrive at Δ3 goes through the range of f-ratios from Δ2 to Δ3 and so the ratio Rp1/Rp2 does not remain at least Rmin when changing the f-ratio continuously by at least Δ3. Contour plots of Rp1/Rp2 versus changes in at least two f-ratios, or separate contour plots for first and second order reflection band strengths versus changes in at least two f-ratios, can allow desired ranges of the at least two f-ratios to be identified that result in a robust suppression of the second order reflection band, for example.

A reflection band may be understood to include a reflectance relative to a baseline of at least 5%. Thus, when Rp2 is less than 5%, the multilayer optical film may be described as having no second order reflection band. The optical multilayer optical film may be described as having at least no second order reflection band when the optical multilayer optical film has no second order reflection band and optionally has no third, fourth, etc., order reflection bands. In some embodiments, for a substantially normally incident light 130 polarized along the x-direction, the multilayer optical film 300 has a first order reflection band 278 disposed at wavelengths greater than about 700 nm, and at least no second order reflection band.

In some embodiments, each of the optical repeat units 10 include at least four sequentially arranged first through fourth individual layers where the first and third individual layers (e.g., A and C layers) have respective f-ratios f1 and f3 for respective indices of refraction nx1 and nx3 in a same in-plane x-direction. In some embodiments, the second and fourth individual layers (e.g., B1 and B2 layers) have respective indices of refraction nx2 and nx4 along the same in-plane x-direction, where $nx1<nx2<nx3$ and $nx1<nx4<nx3$. In some embodiments, each of nx2 and nx4 is between one of nx1 and nx3 and a geometric mean of nx1 and nx3. For example, in some embodiments, $nx1<nx2<(nx3×nx1)^{1/2}$ and $nx1<nx4<(nx3×nx1)^{1/2}$. In some embodiments, $nx1+0.02<nx2<(nx3×nx1)^{1/2}-0.03$ and $nx1+0.02<nx4<(nx3×nx1)^{1/2}-0.03$. In some embodiments, $nx1+0.03<nx2<(nx3×nx1)^{1/2}-0.05$ and $nx1+0.03<nx4<(nx3×$ $nx1)^{1/2}-0.05$. In some embodiments, $|nx2-(nx3×nx1)^{1/2}|$ and $|nx4-(nx3×nx1)^{1/2}|$ are each greater than 0.03, or greater than 0.04, or greater than 0.05. Suitable f-ratios for optical films having refractive indices in any of these ranges include those where f1 is at least 0.44 and those where f1 is no more than 0.1. In some embodiments, $0.44≤f1≤0.55$ and $0.02≤f3≤0.55$, or $0.45≤f1≤0.55$ and $0.02≤f3≤0.45$, or $0.46≤f1≤0.54$ and $0.02≤f3≤0.4$. In some embodiments, $0.02≤f1≤0.1$ and $0.02≤f3≤0.65$, or $0.02≤f1≤0.1$ and $0.1≤f3≤0.5$, or $0.02≤f1≤0.1$ and $0.1≤f3≤0.45$. Suitable materials for the layers having refractive indices in any of these ranges include those described elsewhere herein. In some embodiments, the first individual layer comprises polyethylene naphthalate (PEN), the third individual layer comprises polymethylmethacrylate (PMMA) or a copolymer of methyl methacrylate and ethyl acrylate (coPMMA), and each of the second and fourth individual layers comprises glycol-modified polyethylene terephthalate (PETG) or copolyethylene naphthalate terephthalate copolymer (coPEN). Any layer described as comprising a polymeric material may be a layer of that polymeric material. For example, a layer comprising PEN may be a PEN layer.

Figure 6:
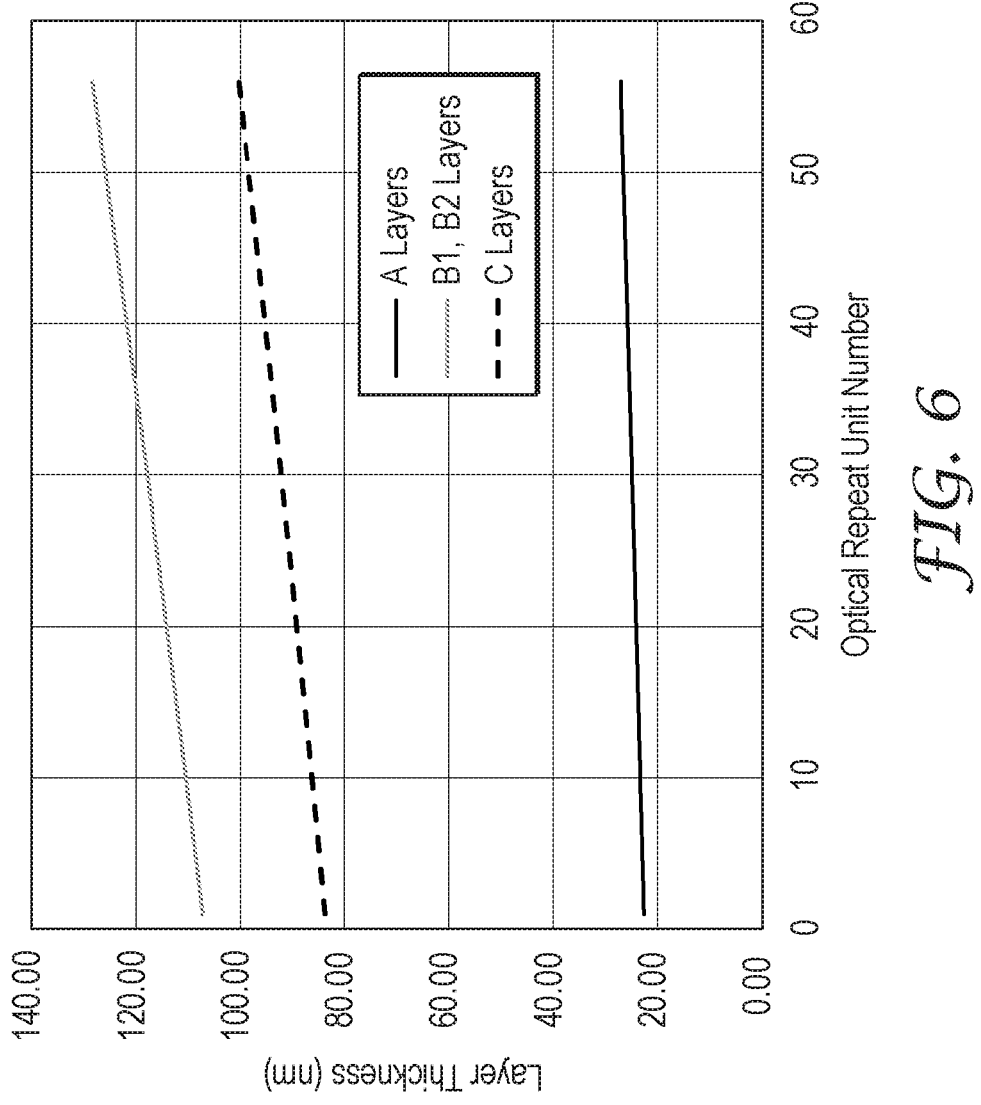
FIG. 6 is a layer thickness profile for a first exemplary multilayer optical film.
Figure 7:
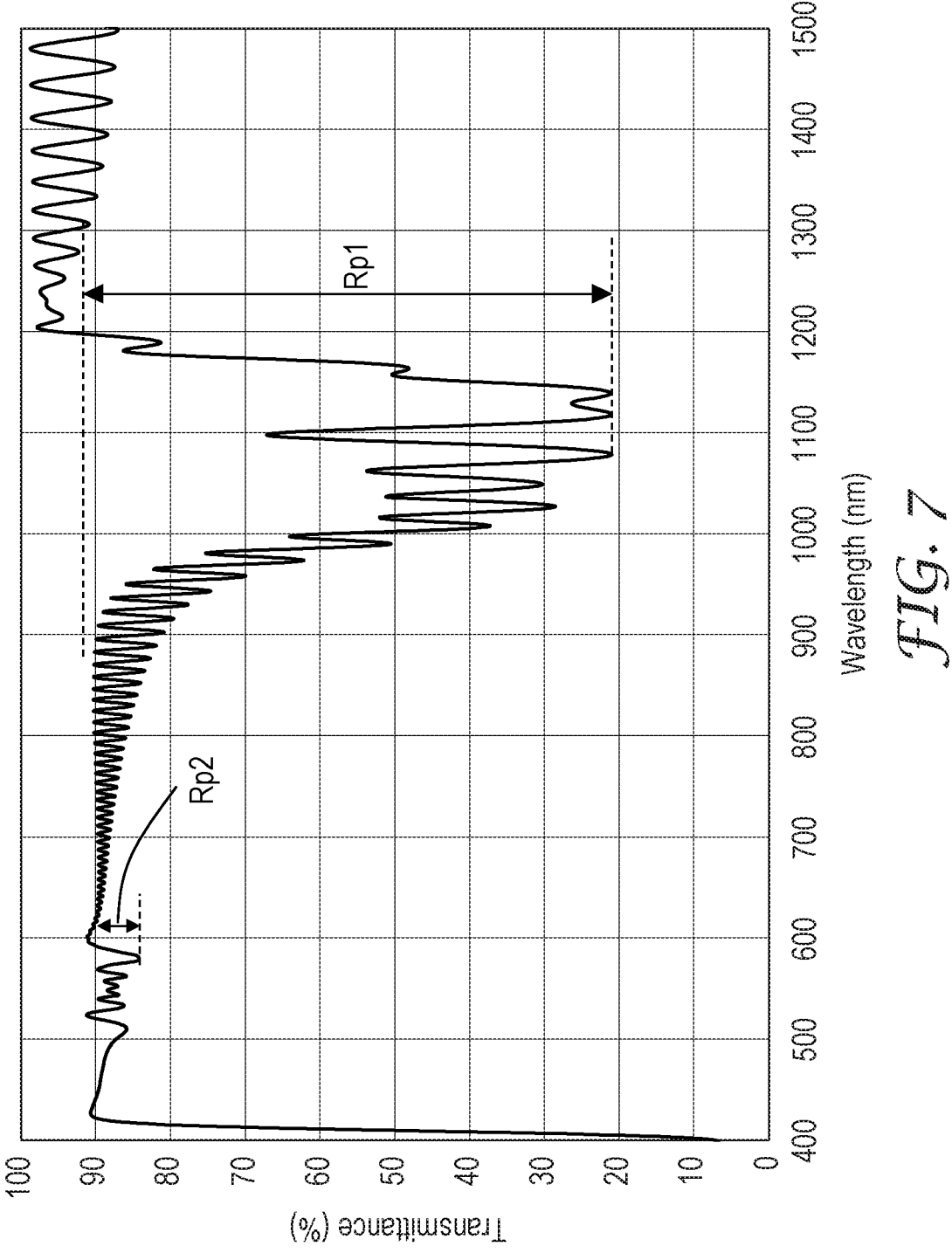
FIG. 7 is a plot of optical transmittance of the first exemplary multilayer optical film.

The thickness of an optical repeat unit determines the wavelengths reflected by the optical repeat unit and the refractive index differences between layers in the optical repeat unit determine the strength of the reflection. Accordingly, the optical reflectance and transmittances of FIGS. 3-4, for example, can be achieved by suitable selection of layer materials to define refractive index differences and suitable selection of layer thickness profiles. FIG. 6 is an exemplary plot of layer thickness versus optical repeat unit number for various layers in an optical repeat unit. Given the refractive indices and layer thickness of the layers of a multilayer optical film, the optical transmission spectra of the optical film can be calculated using conventional optical modeling techniques. FIG. 7 is a plot of calculated optical transmittance of the plurality of optical repeat units as a function of wavelength determined from the layer thickness profile of FIG. 6 when the A layers are biaxially oriented PEN layers having refractive indices in the x-, y-, and z-directions of about 1.766, 1.74. and 1.49, respectively; the B1 and B2 layers are PETG layers having a refractive index in each direction of about 1.56; and the C layers are coPMMA layers having a refractive index in each direction of about 1.49. Similar optical transmittances can be obtained when the C layers are PMMA layers, styrenic block copolymer layers, or acrylic block copolymer layers, for example. The calculated transmittance of FIG. 7, and the calculated transmittances of FIGS. 9, 12, 14, 17 and 19, are for substantially normally incident light 130 polarized along the x-direction. Since the optical films are biaxially oriented in these cases, the reflectance for substantially normally incident light 230 polarized along the y-direction will be about the same as shown in these figures. The refractive indices along the x-direction for the A, B, and C layers may be denoted nA, nB, and nC, respectively. The reflection peak heights Rp1 and Rp2 are schematically indicated in FIG. 7 where it is assumed that optical absorption is negligible so that reflectance is 100% minus transmittance. In this case, the A layers have an f-ratio (e.g., one of f1 and f3) of 0.08, each of the B1 and B2 layers have an f-ratio of 0.355, and the C layers have an f-ratio (e.g., the other of f1 and f3) of 0.25.

Figure 8:
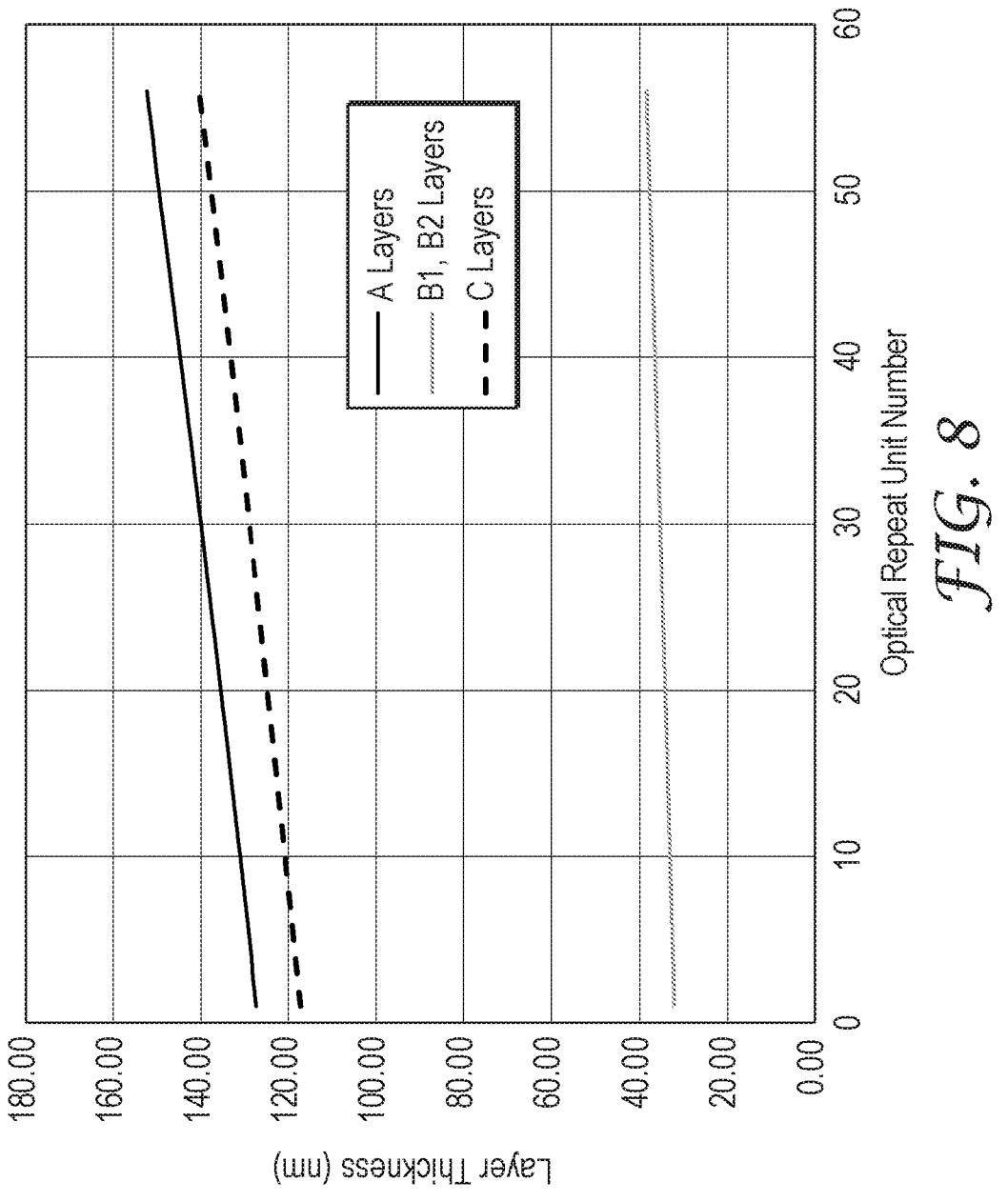
FIG. 8 is a layer thickness profile for a second exemplary multilayer optical film.
Figure 9:
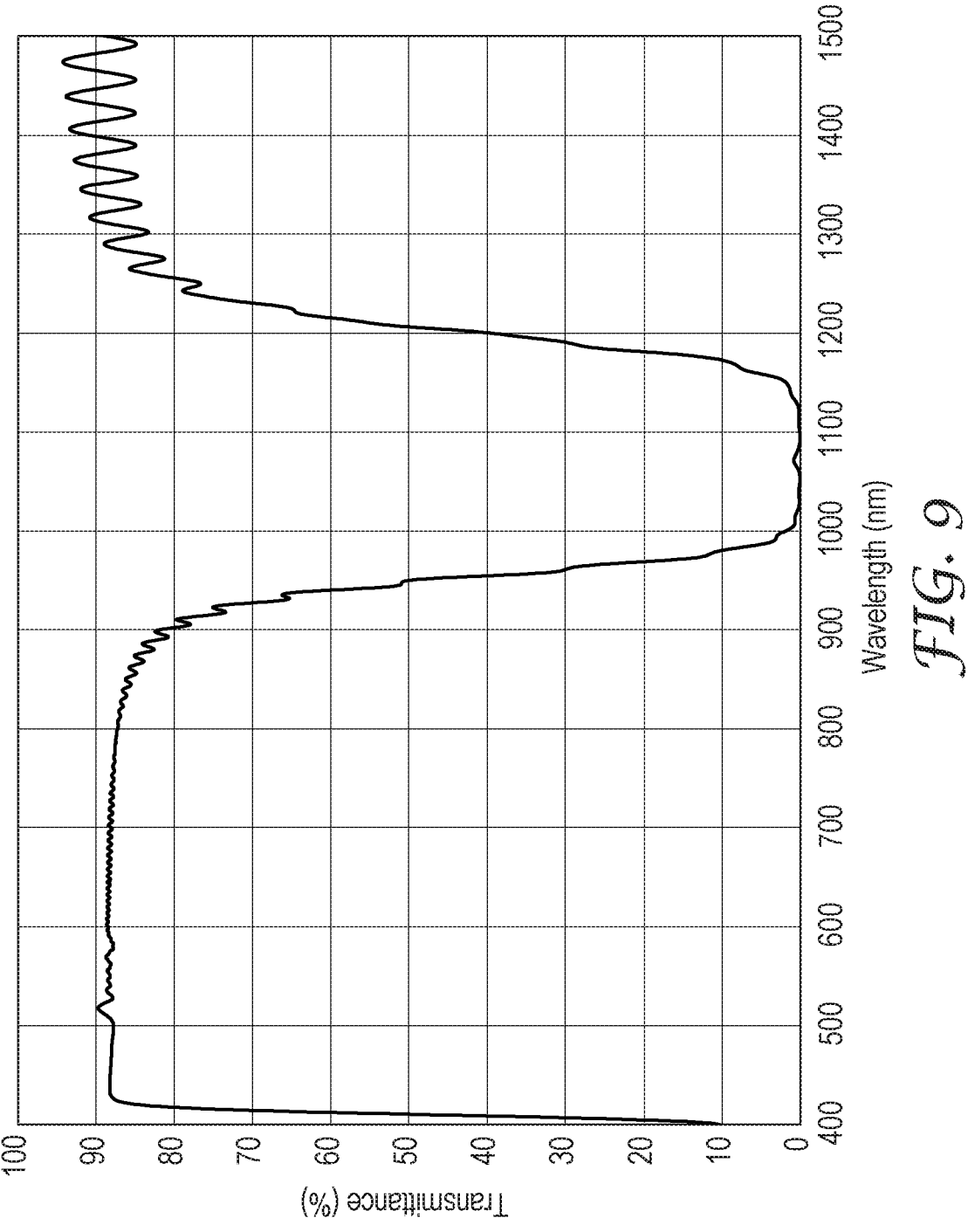
FIG. 9 is a plot of optical transmittance of the second exemplary multilayer optical film.

FIG. 8 is another exemplary plot of layer thickness versus optical repeat unit number for various layers in an optical repeat unit. FIG. 9 is a plot of calculated optical transmittance of the plurality of optical repeat units as a function of wavelength determined from the layer thickness profile of FIG. 8 when the layer materials are as described for FIGS. 6-7. In this case, the A layers have an f-ratio (e.g., one of f3 and f1) of 0.45, each of the B1 and B2 layers have an f-ratio of 0.1, and the C layers have an f-ratio (e.g., the other of f3 and f1) of 0.35.

Figure 10B:
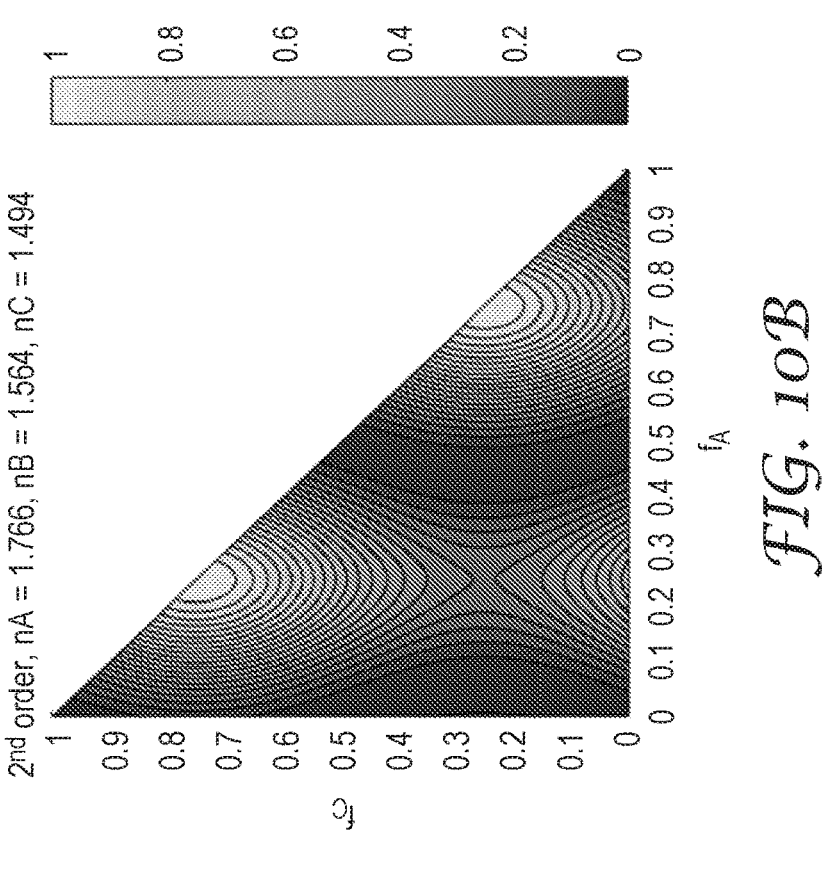
FIGS. 10A-10B are contour plots illustrating the relative reflection strengths of first and second order reflection bands, respectively, for optical films corresponding to the first and second exemplary multilayer optical films.
Figure 10A:
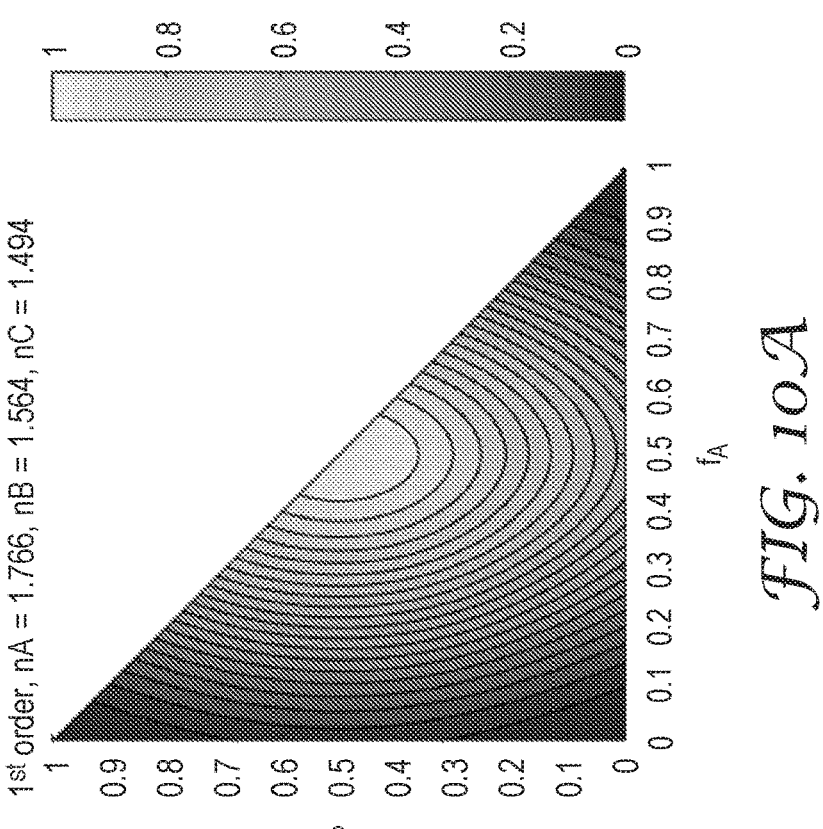

FIGS. 10A-10B are contour plots illustrating the relative reflection strengths of the first and second order reflection bands, respectively, for the layer materials described for FIGS. 6-9. The optical thicknesses of the optical repeat units are held fixed and the f-ratios of the two B layers are kept equal to one another while the f-ratios of the A and C layers are changed. FIG. 10B shows two regions of high second order harmonic suppression. One of these regions may be characterized by $0 < f_A \leq 0.1$ and $0 < f_C \leq 0.65$, and the other of these regions may be characterized by $0.44 \leq f_A \leq 0.55$ and $0 < f_C \leq 0.55$. Typically, it is preferred that the smallest f-ratio for any layer in the optical repeat unit be at least 0.005, or at least 0.01, or at least 0.02, or at least 0.03. In some embodiments, $0.02 \leq f_A \leq 0.1$ and $0.02 \leq f_C \leq 0.65$, or $0.44 \leq f_A \leq 0.55$ and $0.02 \leq f_C \leq 0.55$.

In some embodiments, each of the optical repeat units 10 includes at least four individual layers, where first (e.g., one of the A and C layers) and second (e.g., the other of the A and C layers) individual layers in the at least four individual layers of each of the optical repeat units 10 have respective f-ratios f1 and f2 for respective indices of refraction in a same in-plane x-direction. In some embodiments, $0.5 \leq f1 \leq 0.8$ and $0.02 \leq f2 \leq 0.3$, such that for a substantially normally incident light 130 polarized along the x-direction, the multilayer optical film 300 has a first order reflection band 278 disposed at wavelengths greater than about 700 nm, and at least no second order reflection band. In some embodiments, $0.02 \leq f2 \leq 0.25$. In some embodiments, $0.55 \leq f1 \leq 0.8$, or $0.55 \leq f1 \leq 0.75$, or $0.55 \leq f1 \leq 0.7$. In some embodiments, at least a third layer (e.g., B1 and/or B2) in the at least four individual layers of each of the optical repeat units has an average thickness of less than about 75 nm, or the average thickness can be in any range described elsewhere herein. In some embodiments, at least the third layer has an index of refraction along the x-direction greater than each of the indices of refraction along the x-direction of the first and second individual layers. As described further elsewhere herein, the first and second individual layers can have a same composition or can have different compositions. In some embodiments, each of the first and second individual layers comprises a copolymer of methyl methacrylate and ethyl acrylate (coPMMA) and the at least the third layer comprises polyethylene naphthalate (PEN), for example.

In some embodiments, each of the optical repeat units 10 include at least four sequentially arranged first through fourth individual layers where the first and third individual layers (e.g., A and C layers) have respective f-ratios f1 and f3 for respective indices of refraction nx1 and nx3 in a same in-plane x-direction. In some embodiments, the second and fourth individual layers have respective indices of refraction nx2 and nx4 along the same in-plane x-direction, where each of nx2 and nx4 is greater than each of nx1 and nx3. In some embodiments, each of nx2 and nx4 is greater than each of nx1 and nx3 by at least 0.05, or at least 0.1, or at least 0.15. In some such embodiments, or in other embodiments, $0.45 \leq f1 \leq 0.8$ and $0.02 \leq f3 \leq 0.4$, or $0.5 \leq f1 \leq 0.8$ and $0.02 \leq f3 \leq 0.4$, or $0.5 \leq f1 \leq 0.75$ and $0.02 \leq f3 \leq 0.3$, or $0.5 \leq f1 \leq 0.75$ and $0.02 \leq f3 \leq 0.25$, or $0.55 \leq f1 \leq 0.7$ and $0.02 \leq f3 \leq 0.2$. Since the sequentially arranged first through fourth individual layers can be taken to be, in sequence, A, B1, C, B2 (numbering from an A layer down in FIG. 1B, for example) or C, B1, A, B2 (numbering from a C layer up in FIG. 1B, for example, to define a C, B1, A, B2 optical repeat unit), the f1 and f3 values may be interchanged for a same film. For example, embodiments where $0.45 \leq f1 \leq 0.8$ and $0.02 \leq f3 \leq 0.4$ may alternatively be described by $0.02 \leq f1 \leq 0.4$ and $0.45 \leq f3 \leq 0.8$.

In some embodiments, the first individual layer (e.g., A layer) comprises glycol-modified polyethylene terephthalate (PETG), copolyethylene naphthalate terephthalate copolymer (coPEN), polymethylmethacrylate (PMMA), a copolymer of methyl methacrylate and ethyl acrylate (coPMMA), styrenic block copolymer, or acrylic block copolymer; the third individual layer (e.g., C layer) comprises polymethylmethacrylate (PMMA), a copolymer of methyl methacrylate and ethyl acrylate (coPMMA), styrenic block copolymer, or acrylic block copolymer; and each of the second and fourth individual layers (e.g., B1 and B2 layers) comprises polyethylene naphthalate (PEN). In some such embodiments, the first individual layer (e.g., A layer) comprises glycol-modified polyethylene terephthalate (PETG) or copolyethylene naphthalate terephthalate copolymer (coPEN). In some such embodiments, or in other embodiments, $0.02 \leq f1 \leq 0.4$ and $0.45 \leq f3 \leq 0.65$, or $0.02 \leq f1 \leq 0.3$ and $0.5 \leq f3 \leq 0.65$, or $0.45 \leq f1 \leq 0.8$ and $0.02 \leq f3 \leq 0.25$, or $0.5 \leq f1 \leq 0.8$ and $0.1 \leq f3 \leq 0.25$.

Figure 11:
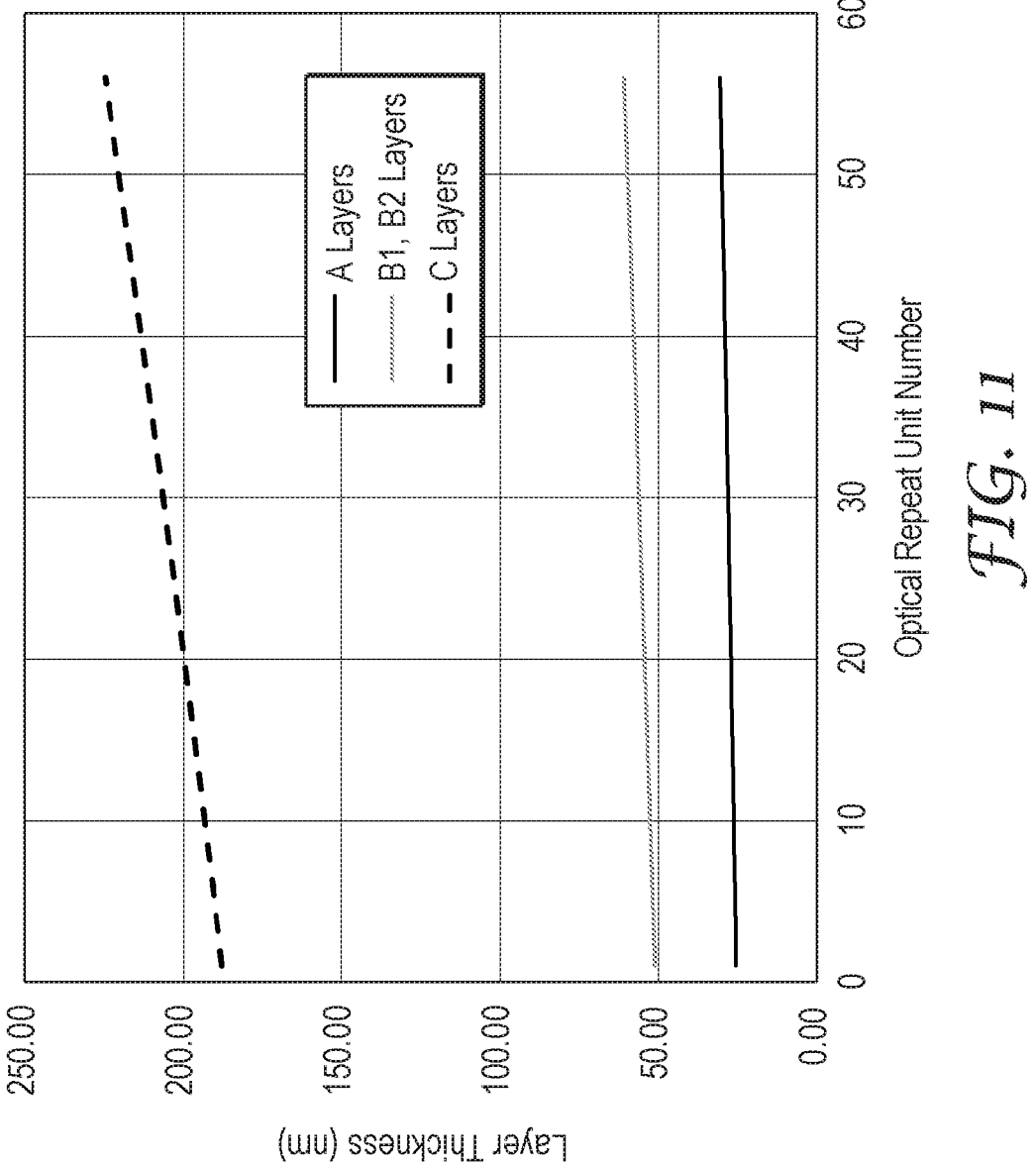
FIG. 11 is a layer thickness profile for a third exemplary multilayer optical film.
Figure 12:
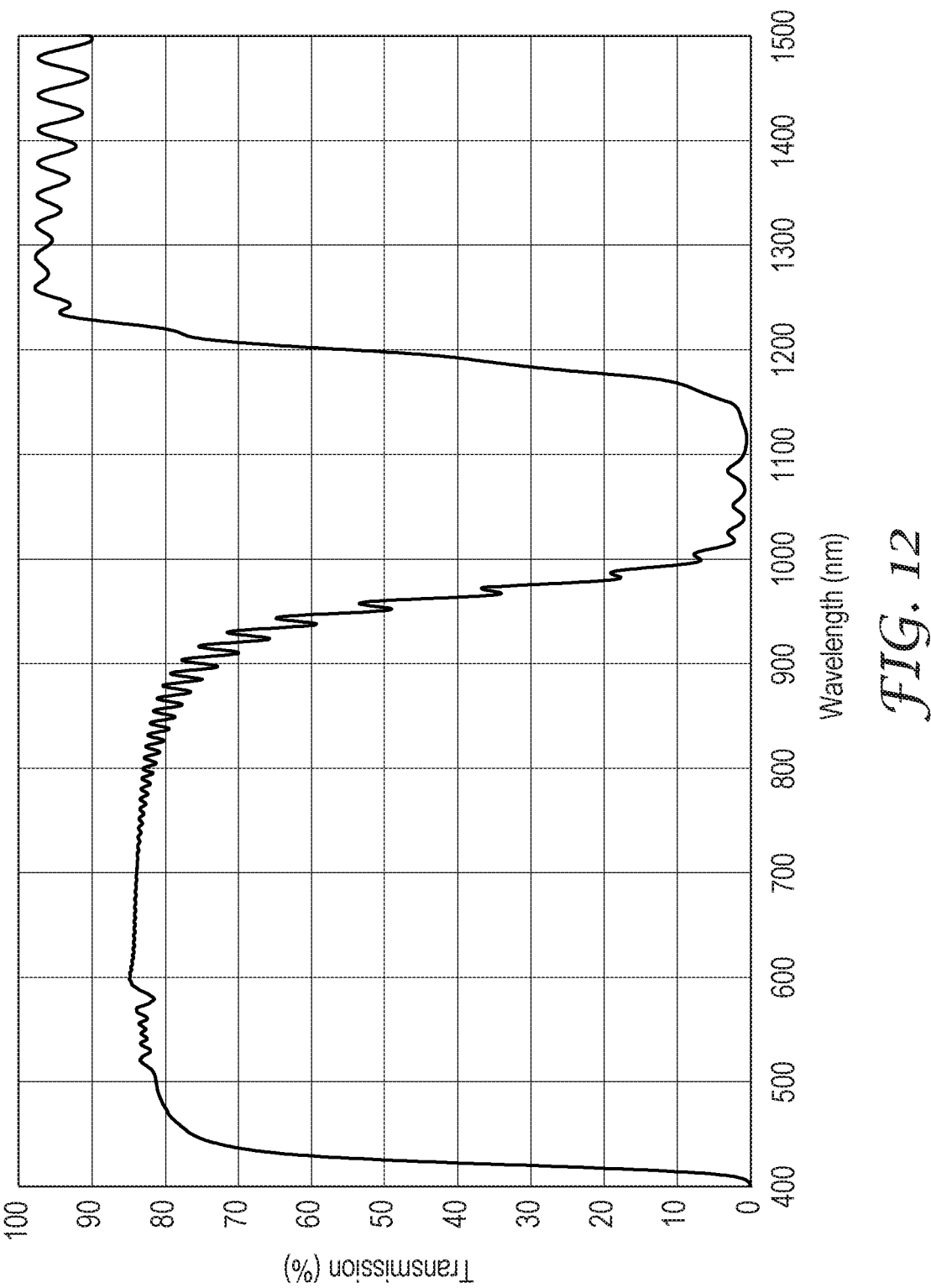
FIG. 12 is a plot of optical transmittance of the third exemplary multilayer optical film.

In some embodiments, each of the first and third individual layers (e.g., A and C layers) comprises polymethylmethacrylate (PMMA), a copolymer of methyl methacrylate and ethyl acrylate (coPMMA), styrenic block copolymer, or acrylic block copolymer, and each of the second and fourth individual layers comprises polyethylene naphthalate (PEN). In some embodiments utilizing these layer materials, or in other embodiments, $0.02 \leq f1 \leq 0.4$, or $0.02 \leq f1 \leq 0.3$, or $0.02 \leq f1 \leq 0.25$, or $0.02 \leq f1 \leq 0.2$. In some such embodiments. or in other embodiments, $0.45 \leq f3 \leq 0.8$, or $0.5 \leq f3 \leq 0.8$, or $0.5 \leq f3 \leq 0.75$, or $0.55 \leq f3 \leq 0.7$. In some embodiments utilizing these layer materials, or in other embodiments, $0.02 \leq f3 \leq 0.4$, or $0.02 \leq f3 \leq 0.3$, or $0.02 \leq f3 \quad 0.25$, or $0.02 \leq f3 \leq 0.2$. In some such embodiments. or in other embodiments, $0.45 \leq f1 \leq 0.8$, or $0.5 \leq f1 \leq 0.8$, or $0.5 \leq f1 \leq 0.75$, or $0.55 \leq f1 \leq 0.7$. FIG. 11 is an exemplary plot of layer thickness versus optical repeat unit number for various layers in an optical repeat unit. FIG. 12 is a plot of calculated optical transmittance of the plurality of optical repeat units as a function of wavelength determined from the layer thickness profile of FIG. 11 when the A layers are PETG layers having a refractive index in each direction of about 1.56, the B1 and B2 layers are each biaxially oriented PEN layers having refractive indices in the x-, y-, and z-directions of about 1.766, 1.74. and 1.49, respectively; and the C layers are coPMMA layers having a refractive index in each direction of about 1.49. In this case, the A layers have an f-ratio (e.g., one of f1 and f3) of 0.08, each of the B1 and B2 layers have an f-ratio of 0.18, and the C layers have an f-ratio (e.g., the other one of f1 and f3) of 0.56. Similar optical transmittances can be obtained when the C layers are PMMA layers, styrenic block copolymer layers, or acrylic block copolymer layers, for example.

Figure 13:
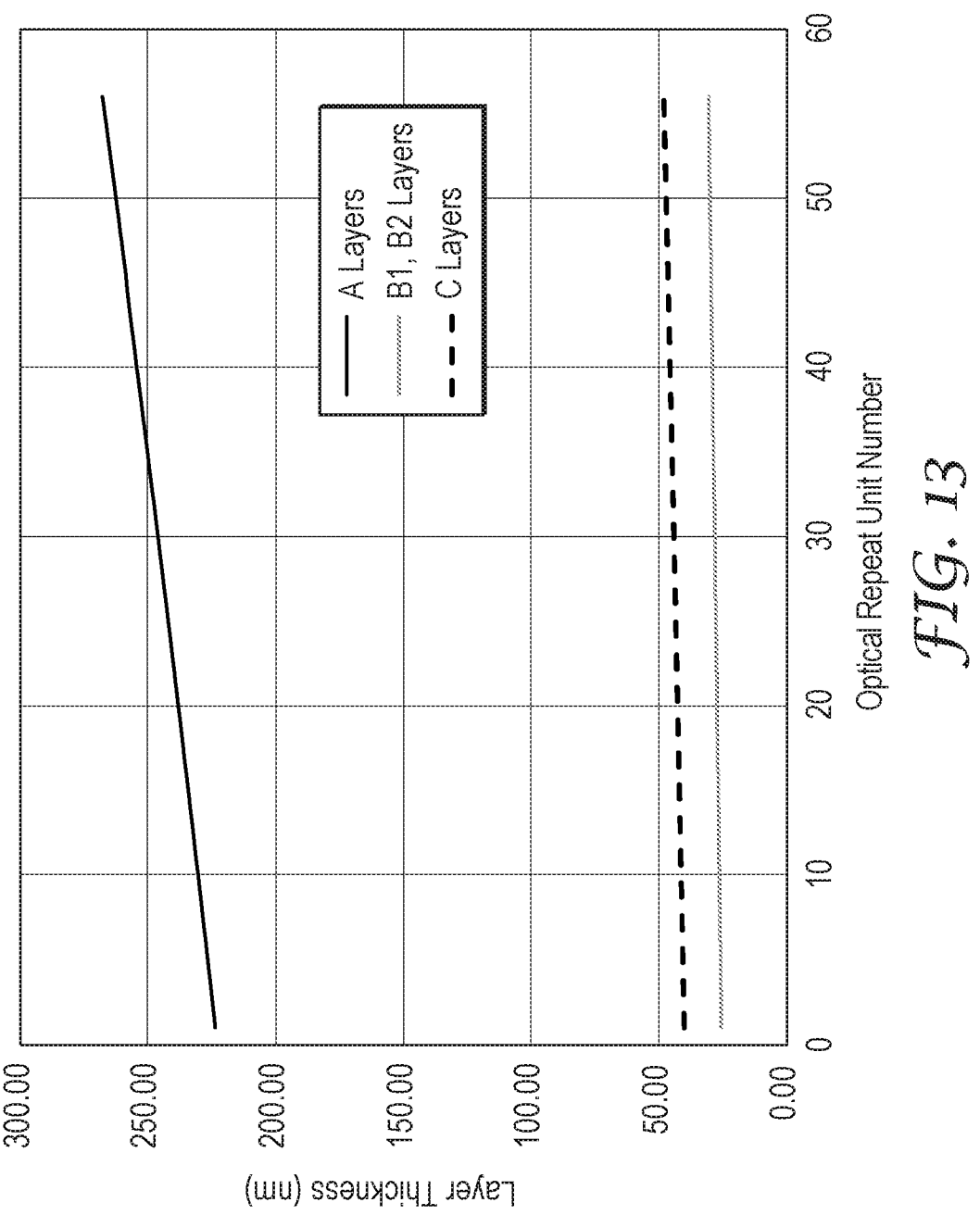
FIG. 13 is a layer thickness profile for a fourth exemplary multilayer optical film.
Figure 14:
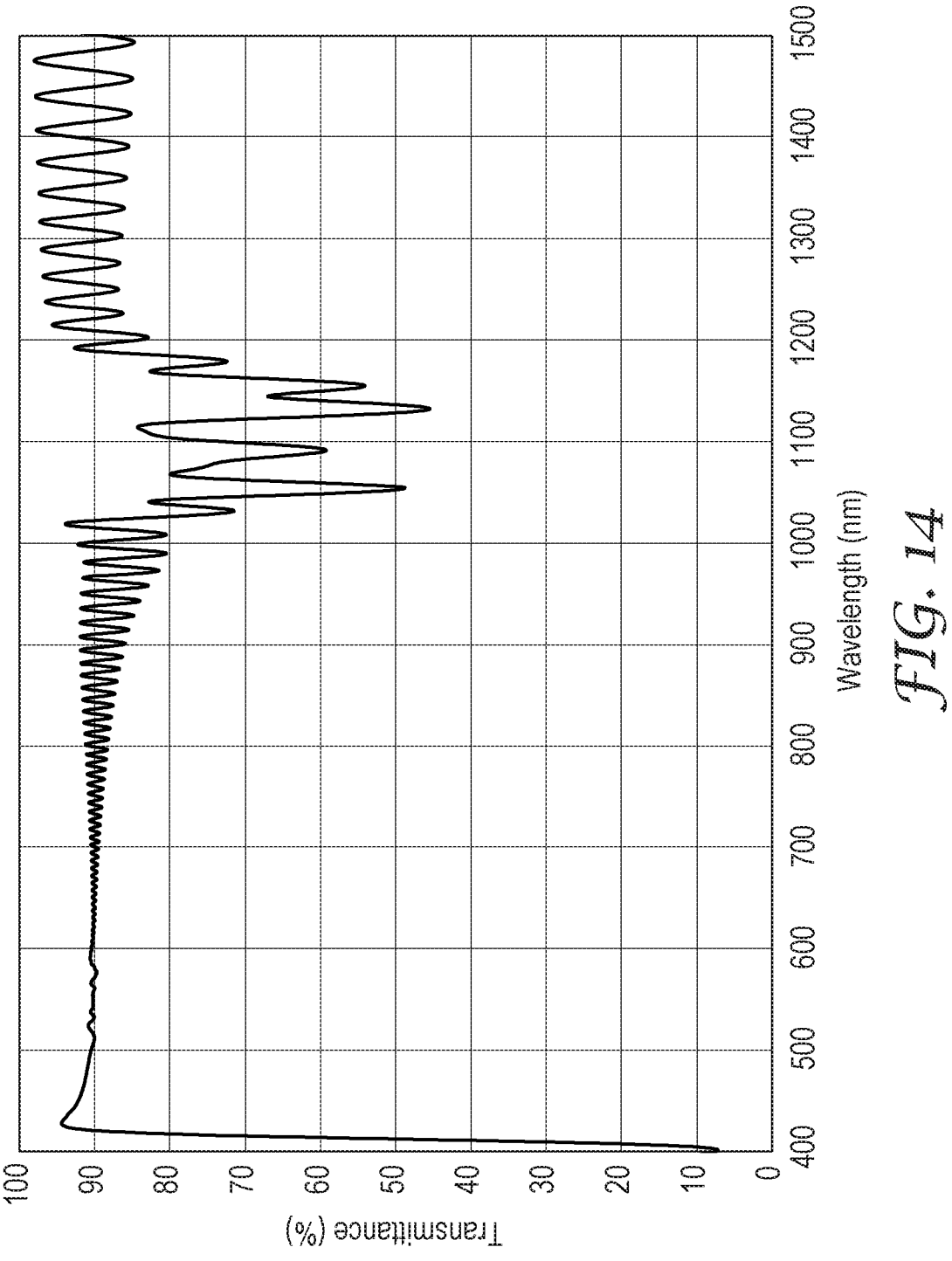
FIG. 14 is a plot of optical transmittance of the fourth exemplary multilayer optical film.

FIG. 13 is an exemplary plot of layer thickness versus optical repeat unit number for various layers in an optical repeat unit. FIG. 14 is a plot of calculated optical transmittance of the plurality of optical repeat units as a function of wavelength determined from the layer thickness profile of FIG. 13 when the layer materials are as described for FIGS. 11-12. In this case, the A layers have an f-ratio (e.g., one of f1 and f3) of 0.7, each of the B1 and B2 layers have an f-ratio of 0.09, and the C layers have an f-ratio (e.g., the other one of f1 and f3) of 0.12.

Figure 15B:
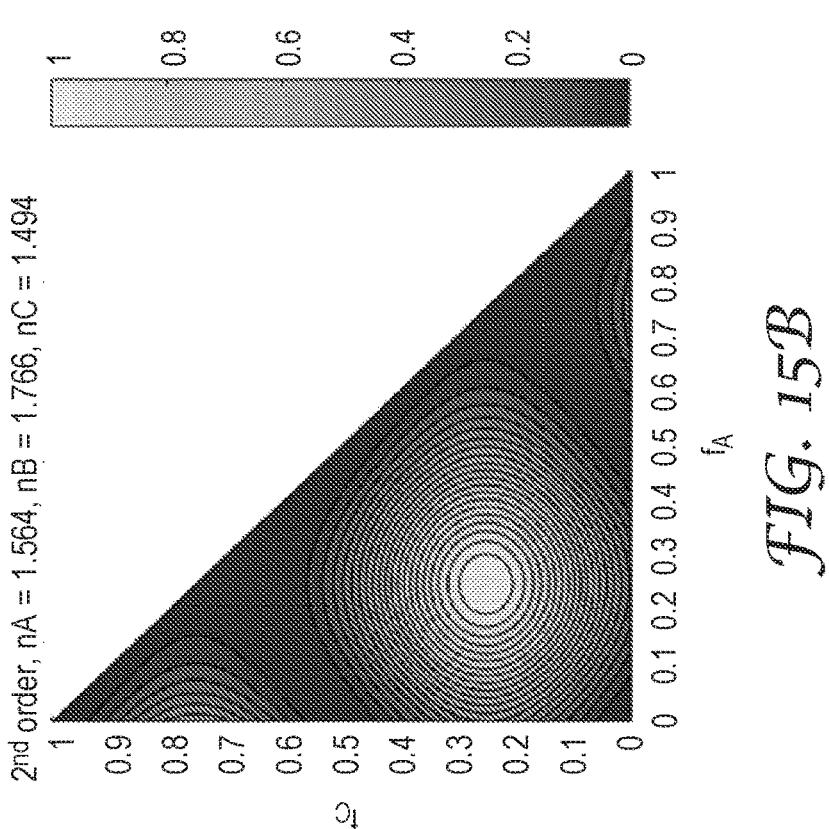
FIGS. 15A-15B are contour plots illustrating the relative reflection strengths of first and second order reflection bands, respectively, for optical films corresponding to the third and fourth exemplary multilayer optical films.
Figure 15A:
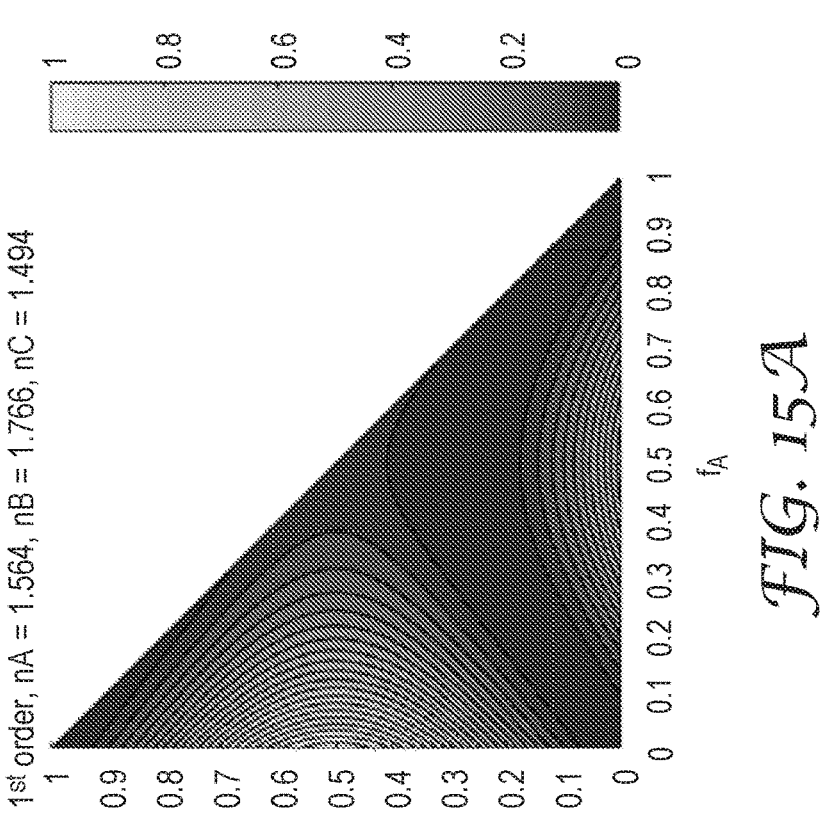

FIGS. 15A-15B are contour plots illustrating the relative reflection strengths of the first and second order reflection bands, respectively, for the layer materials described for FIGS. 11-14. The optical thicknesses of the optical repeat units are held fixed and the f-ratios of the two B layers are kept equal to one another while the f-ratios of the A and C layers are changed. FIG. 15B shows two regions of high second order harmonic suppression. One of these regions may be characterized by $0<f_A\leq0.4$ and $0.45\leq f_C\leq0.65$, and the other of these regions may be characterized by $0.45 f_A\leq0.8$ and $0<f_C\leq0.25$.

Figure 16:
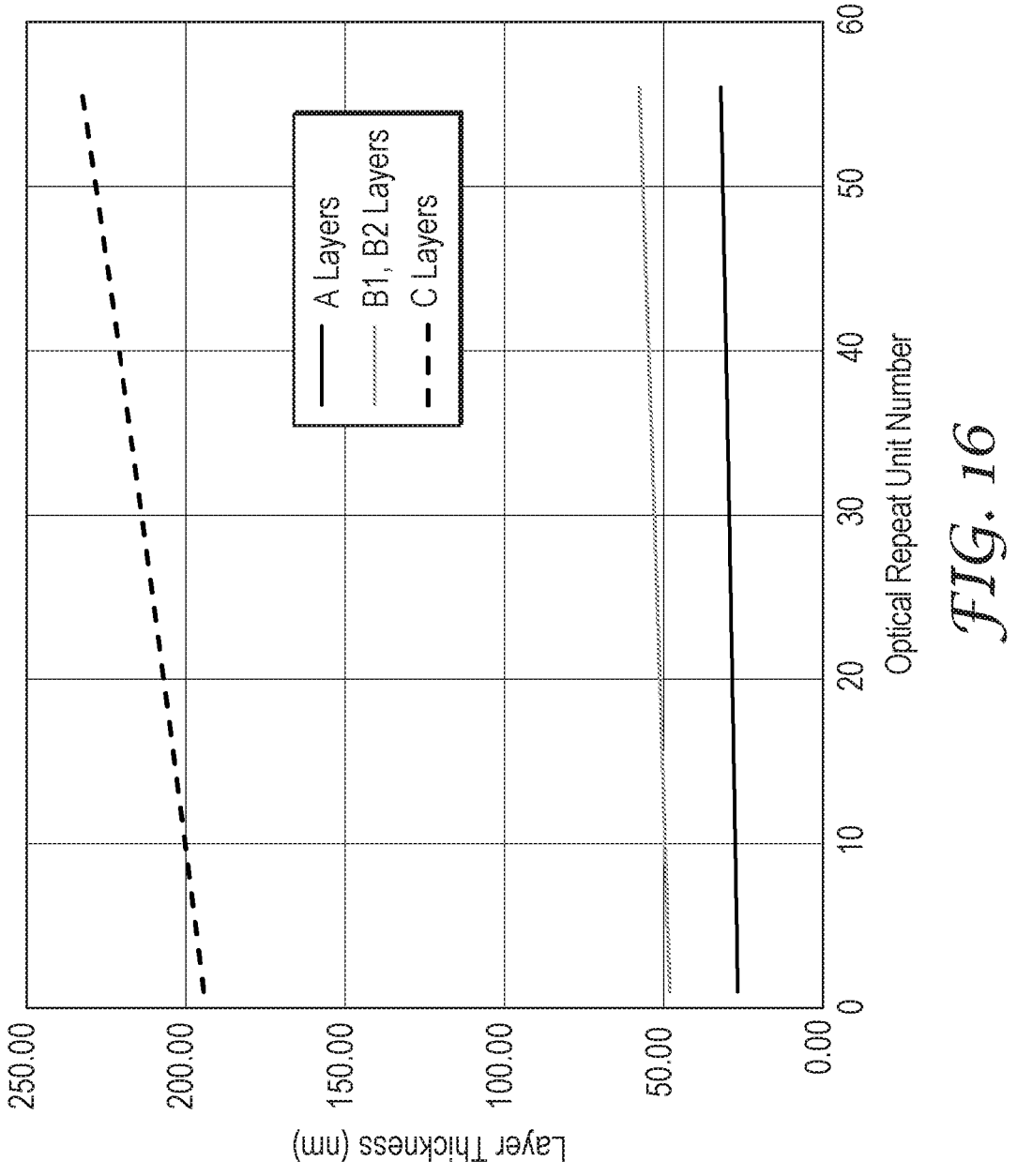
FIG. 16 is a layer thickness profile for a fifth exemplary multilayer optical film.
Figure 17:
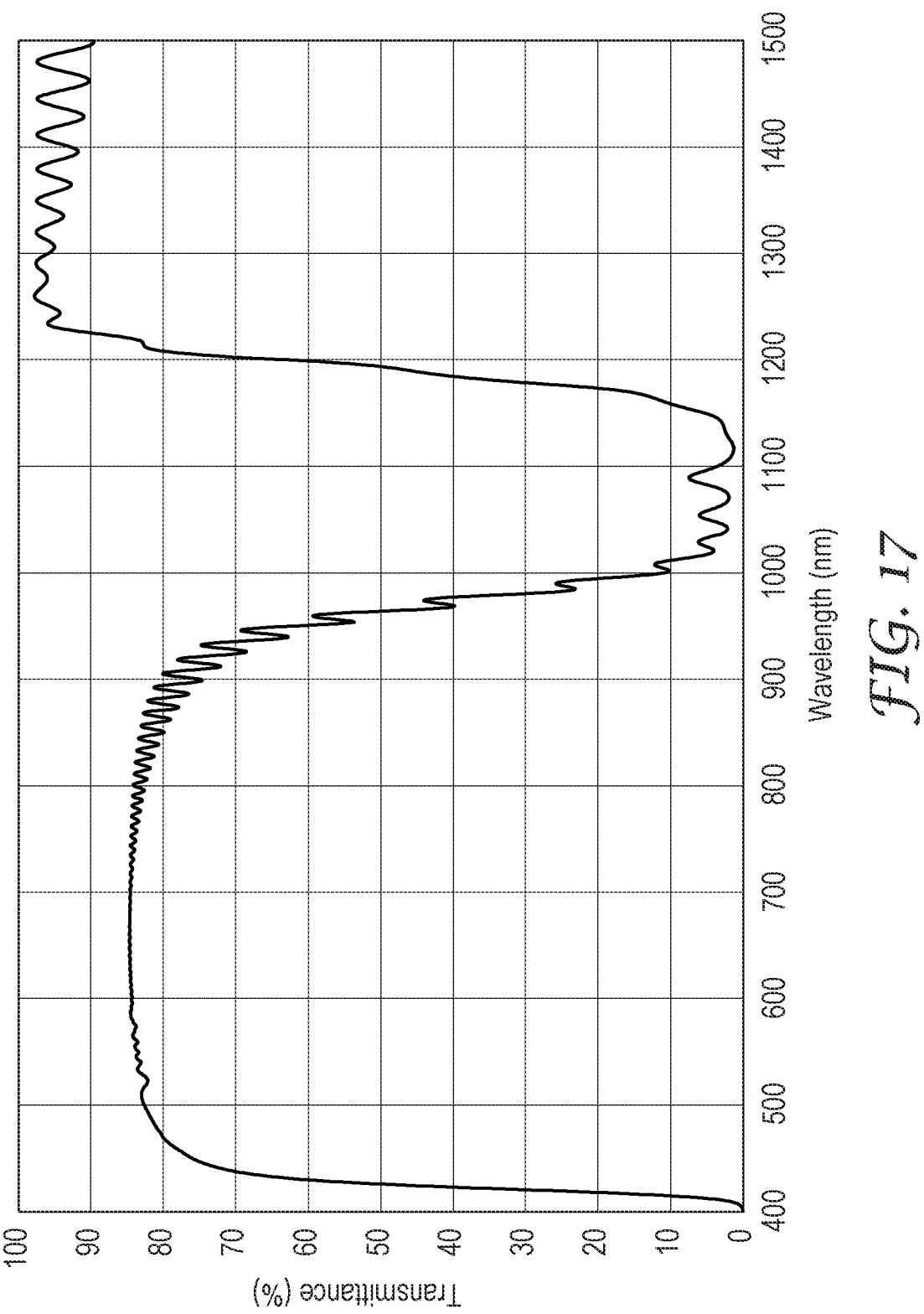
FIG. 17 is a plot of optical transmittance of the fifth exemplary multilayer optical film.

FIG. 16 is an exemplary plot of layer thickness versus optical repeat unit number for various layers in an optical repeat unit. FIG. 17 is a plot of calculated optical transmittance of the plurality of optical repeat units as a function of wavelength determined from the layer thickness profile of FIG. 16 when the B1 and B2 layers are each biaxially oriented PEN layers having refractive indices in the x-, y-, and z-directions of about 1.766, 1.74. and 1.49, respectively; and each of the A and C layers are coPMMA layers having a refractive index in each direction of about 1.49. In this case, the A layers have an f-ratio (e.g., one of f1 and f3) of 0.08, each of the B1 and B2 layers have an f-ratio of 0.17, and the C layers have an f-ratio (e.g., the other one of f1 and f3) of 0.58. Similar optical transmittances can be obtained when each of the A and C layers are PMMA layers, styrenic block copolymer layers, or acrylic block copolymer layers, for example.

Figure 18:
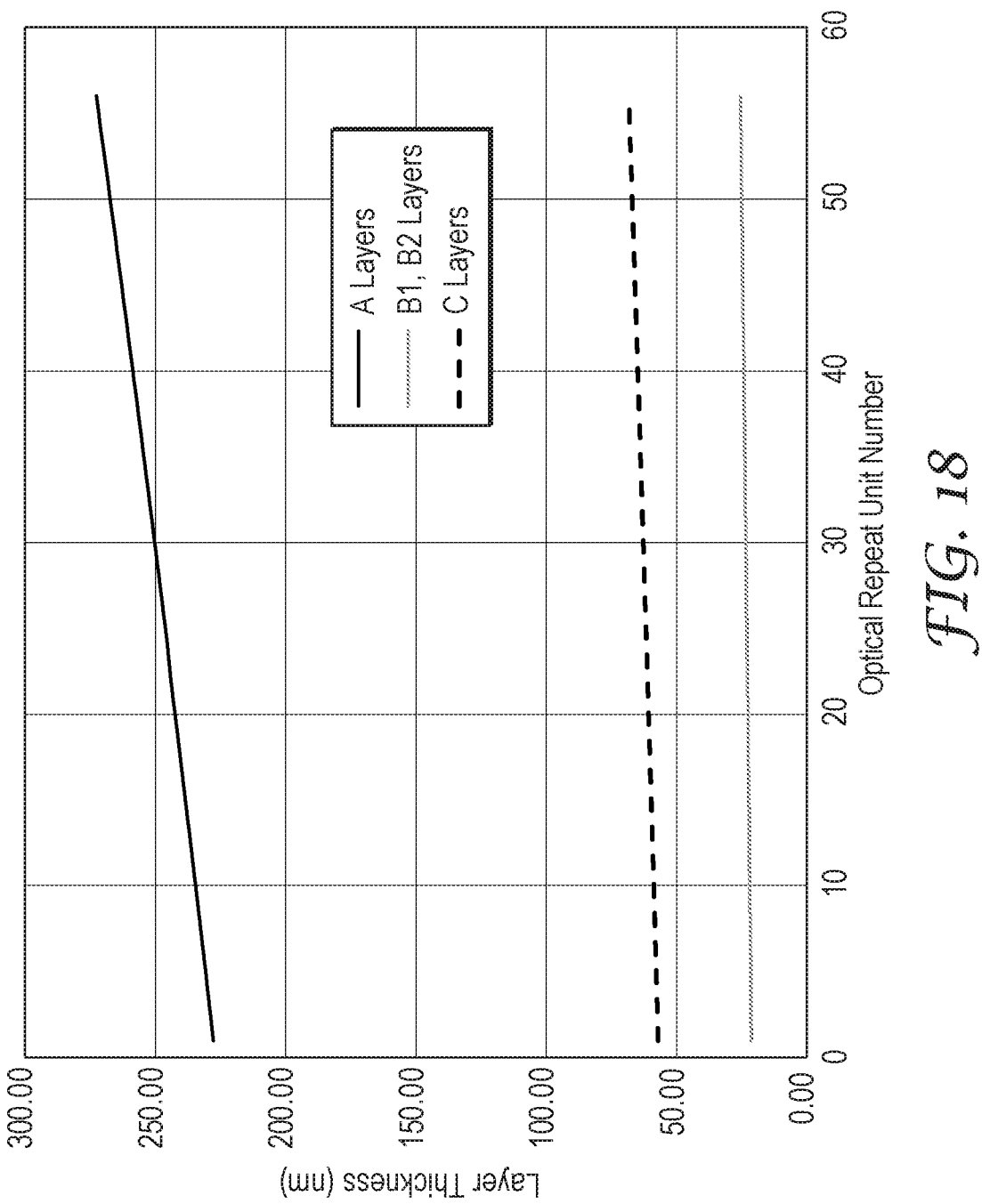
FIG. 18 is a layer thickness profile for a sixth exemplary multilayer optical film.
Figure 19:
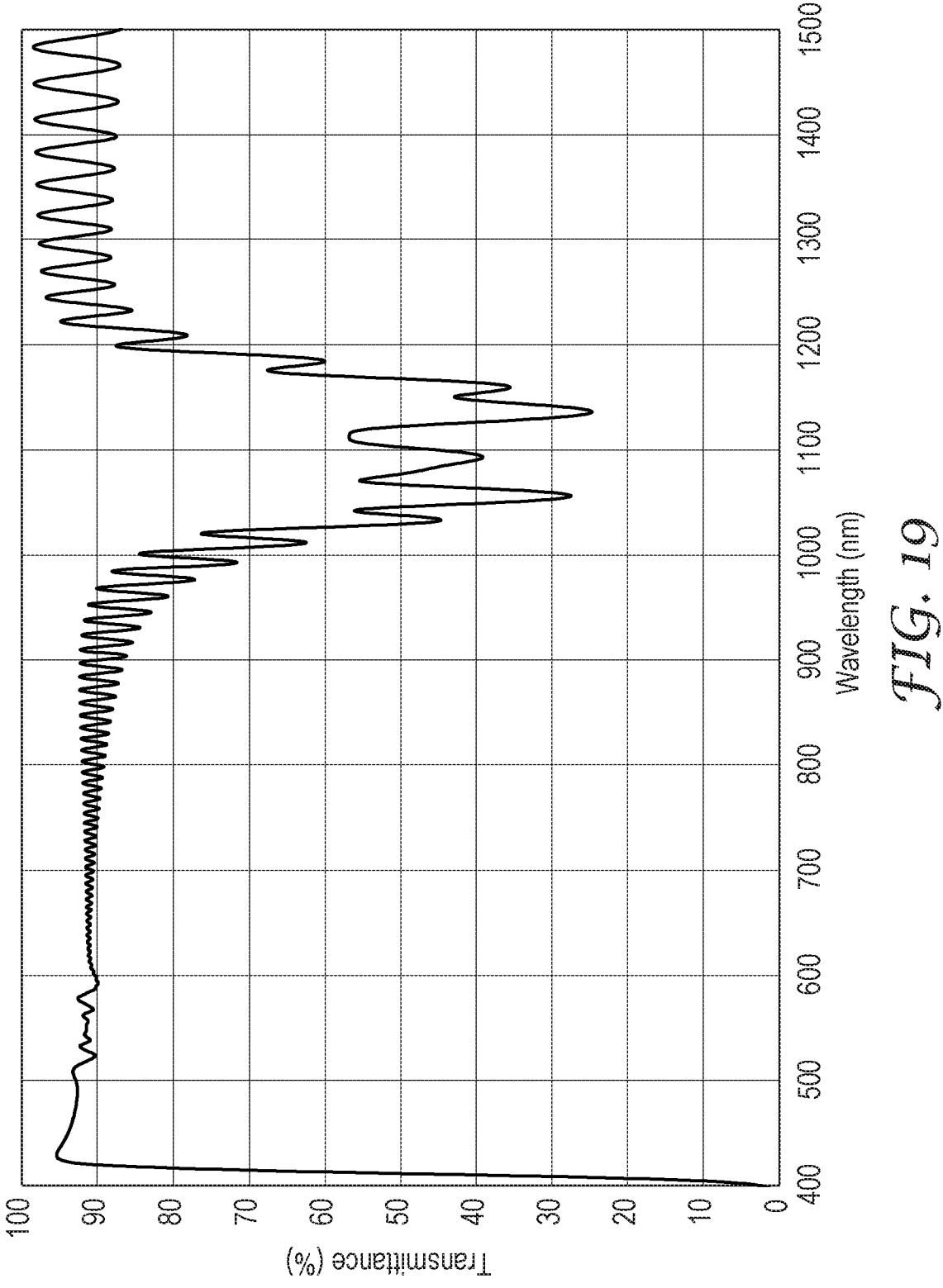
FIG. 19 is a plot of optical transmittance of the sixth exemplary multilayer optical film.

FIG. 18 is an exemplary plot of layer thickness versus optical repeat unit number for various layers in an optical repeat unit. In this case, for each of the optical repeat units: an average thickness of the A layer is greater than an average thickness of each other layer of the first through fourth individual layers by at least a factor of 2.5; and an average thickness of the C layer differs from an average thickness of each other layer of the first through fourth individual layers by at least a factor of 2.5, since the C layer is thicker than each of the B1 and B2 by at least a factor of 2.5 and the C layer is thinner than the A layer by at least a factor of 2.5. FIG. 19 is a plot of calculated optical transmittance of the plurality of optical repeat units as a function of wavelength determined from the layer thickness profile of FIG. 18 when the layer materials are as described for FIGS. 16-17. In this case, the A layers have an f-ratio (e.g., one of f1 and f3) of 0.68, each of the B1 and B2 layers have an f-ratio of 0.075, and the C layers have an f-ratio (e.g., the other one of f1 and f3) of 0.17.

Figures 20A, 20B:
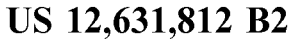
FIGS. 20A-20B are contour plots illustrating the relative reflection strengths of first and second order reflection bands, respectively, for optical films corresponding to the fifth and sixth exemplary multilayer optical films.

FIGS. 20A-20B are contour plots illustrating the relative reflection strengths of the first and second order reflection bands, respectively, for the layer materials described for FIGS. 16-19. The optical thicknesses of the optical repeat units are held fixed and the f-ratios of the two B layers are kept equal to one another while the f-ratios of the A and C layers are changed. FIG. 20B shows two regions of high second order harmonic suppression. One of these regions may be characterized by $0<f_A\leq0.4$ and $0.45\leq f_C\leq0.8$, and the other of these regions may be characterized by $0.45 f_A\leq0.8$ and $0<f_C\leq0.4$.

It can be seen from FIGS. 7, 9 and 10A-10B, or from FIGS. 12, 14 and 15A-15B, or from FIGS. 17, 19 and 20A-20B, for example, that the strength of the first order band can be adjusted while keeping any second order band strongly suppressed. This allows a desired reflectance to be achieved in a near infrared wavelength range while maintaining a high transmittance in a visible wavelength range.

In some embodiments, a multilayer optical film 300 includes a plurality of optical repeat units 10, where the optical repeat units in the plurality of optical repeat units number greater than about 10 in total. Each of the optical repeat units in the plurality of optical repeat units includes at least four sequentially arranged first through fourth individual layers. For each of the optical repeat units in the plurality of optical repeat units: an average thickness of each of the second and fourth individual layers is less than an average thickness of each of the first and third individual layers by at least a factor of 2, or an average thickness of a same one of the first and third individual layers differs from an average thickness of each other layer of the first through fourth individual layers by at least a factor of 2.5; the first and third individual layers have respective f-ratios f1 and f3 for respective indices of refraction nx1 and nx3 in a same in-plane x-direction, wherein $0.44\leq f1\leq0.55$ and $0.02\leq f3\leq0.55$; and the second and fourth individual layers have respective indices of refraction nx2 and nx4 along the same in-plane x-direction, $nx1<nx2<nx3$ and $nx1<nx4<nx3$, such that for a substantially normally incident light polarized along the x-direction, the multilayer optical film has a first order reflection band disposed at wavelengths greater than about 600 nm, where the first order reflection band having a first reflection peak having a peak height Rp1, and where any second order reflection band of the multilayer optical film 300 has a reflection peak having a peak height Rp2 where $Rp1/Rp2\geq5$. In some embodiments, $|nx2-(nx3\times nx1)^{1/2}|$ and $|nx4-(nx3\times nx1)^{1/2}|$ are each greater than 0.03. In some such embodiments, or in other embodiments, $nx1<nx2<(nx3\times nx1)^{1/2}$ and $nx1<nx4<(nx3\times nx1)^{1/2}$.

In some embodiments, a multilayer optical film 300 includes a plurality of optical repeat units 10, where the optical repeat units in the plurality of optical repeat units numbering greater than about 10 in total. Each of the optical repeat units in the plurality of optical repeat units includes at least four sequentially arranged first through fourth individual layers. For each of the optical repeat units in in the plurality of optical repeat units: an average thickness of each of the second and fourth individual layers is less than an average thickness of each of the first and third individual layers by at least a factor of 2, or an average thickness of a same one of the first and third individual layers differs from an average thickness of each other layer of the first through fourth individual layers by at least a factor of 2.5; the first and third individual layers have respective f-ratios f1 and f3 for respective indices of refraction nx1 and nx3 in a same in-plane x-direction, wherein $0.45\leq f1\leq0.8$ and $0.02\leq f3\leq0.4$; and the second and fourth individual layers have respective indices of refraction nx2 and nx4 along the same in-plane x-direction, each of nx2 and nx4 being greater than each of nx1 and nx3, such that for a substantially normally incident light polarized along the x-direction, the multilayer optical film 300 has a first order reflection band disposed at wavelengths greater than about 600 nm, the first order reflection band having a first reflection peak having a peak height Rp1, wherein any second order reflection band of the multilayer optical film has a reflection peak having a peak height Rp2 where $Rp1/Rp2\geq5$. In some embodiments, each of nx2 and nx4 is greater than each of nx1 and nx3 by at least 0.05.

In some embodiments, a multilayer optical film 300 includes a plurality of optical repeat units 10, where the optical repeat units in the plurality of optical repeat units numbering greater than about 10 in total. Each of the optical repeat units in the plurality of optical repeat units comprising at least four sequentially arranged first through fourth individual layers. For each of the optical repeat units in the plurality of optical repeat units: an average thickness of a same one of the first and third individual layers differs from an average thickness of each other layer of the first through fourth individual layers by at least a factor of 2.5; the first and third individual layers have respective f-ratios f1 and f3 for respective indices of refraction nx1 and nx3 in a same in-plane x-direction, wherein $0.02 \leq f1 \leq 0.1$ and $0.02 \leq f3 \leq 0.65$; and the second and fourth individual layers have respective indices of refraction nx2 and nx4 along the same in-plane x-direction, $nx1 < nx2 < nx3$ and $nx1 < nx4 < nx3$, such that for a substantially normally incident light polarized along the x-direction, the multilayer optical film has a first order reflection band disposed at wavelengths greater than about 600 nm, the first order reflection band having a first reflection peak having a peak height Rp1, wherein any second order reflection band of the multilayer optical film has a reflection peak having a peak height Rp2 where $Rp1/Rp2 \geq 5$. In some embodiments, $|nx2-(nx3 \times nx1)^{1/2}|$ and $|nx4-(nx3 \times nx1)^{1/2}|$ are each greater than 0.03. In some such embodiments, or in other embodiments, $nx1 < nx2 < (nx3 \times nx1)^{1/2}$ and $nx1 < nx4 < (nx3 \times nx1)^{1/2}$.

Any of the multilayer optical films described herein can have an interlayer adhesion of individual layers in the plurality of optical repeat units of at least about 14 grams per inch when measured at a 90 degree peel angle. In some embodiments, the interlayer adhesion of the individual layers in the plurality of optical repeat units is greater than about 16, 18, 20, 22, 25, 27, 30, 32, 35, 37, 40, 45, 50, or 55 grams per inch when measured at a 90 degree peel angle. In some embodiments, the interlayer adhesion can be up to about 500 grams per inch, or up to about 300 grams per inch, or up to about 200 grams per inch, or up to about 150 grams per inch, or up to about 120 grams per inch, for example. In some embodiments, the interlayer adhesion is in a range of about 14 grams per inch to about 500 grams, or about 30 grams per inch to about 300 grams, for example. The peel force can be increased by suitable selection of materials for the A, B1, C and B2 layers. For example, the B1, B2 layers can be chosen to have adequate bonding to the A and C layers even when the A and C layers would have poor direct bonding to one another. In some embodiments, the B1, B2 layers may be copolymers of the polymers used in the A and C layers. According to some embodiments, layers formed from a polymer having a low glass transition temperature, or a block copolymer containing a (e.g., soft) polymeric block with a low glass transition temperature, or blends thereof have been found to provide improved bonding with other layers described herein. Suitable materials include styrenic block copolymer, acrylic block copolymer, PMMA, coPMMA or blends of any of the latter three, for example. The glass transition temperature (of the B layers or of the soft blocks of the B layers) can be less than 105° C., or less than 100° C., or less than 90° C., or less than 80° C., or less than 70° C., or less than 60° C., or less than 50° C., or less than 40° C., or less than 30° C., or less than 20° C., or less than 10° C., or less than 0° C., or less than −10° C., or less than −20° C., or less than −30° C., or less than −40° C., or less than −50° C., for example. The glass transition temperature of a polymeric block of a copolymer can be determined as the glass transition temperature of a homopolymer of the monomeric units of the polymeric block. The block copolymer may also include other (e.g., hard) blocks for mechanical properties (e.g., for material handling and/or low creep), for example. A (e.g., hard) block for mechanical properties can have a glass transition temperature greater than 50° C., or greater than 60° C., or greater than 70° C., or greater than 80° C., or greater than 90° C., or greater than 100° C., or greater than 105° C., for example. In some embodiments, each B layer is a chemically inert, or substantially chemically inert, polymeric layer. That is, in some embodiments, the polymer of the B layers does not create covalent bonds with the material of the A layer or with the material of the C layers, or creates so few covalent bonds as to negligibly affect the bonding with either of the adjacent layers.

Other suitable materials for the A, B1, C and B2 layers are described further elsewhere herein. As a specific example, an optical mirror made with immediately adjacent sPS and low melt PEN (coPEN 90/10) layers had an interlayer adhesion of individual layers in the plurality of optical repeat units of about 11 grams per inch when measured at a 90 degree peel angle, while an optical mirror that was made similarly but that included a styrenic block copolymer layer between each sPS and low melt PEN layer had an interlayer adhesion of individual layers in the plurality of optical repeat units of about 33 grams per inch when measured at a 90 degree peel angle.

Figure 21:
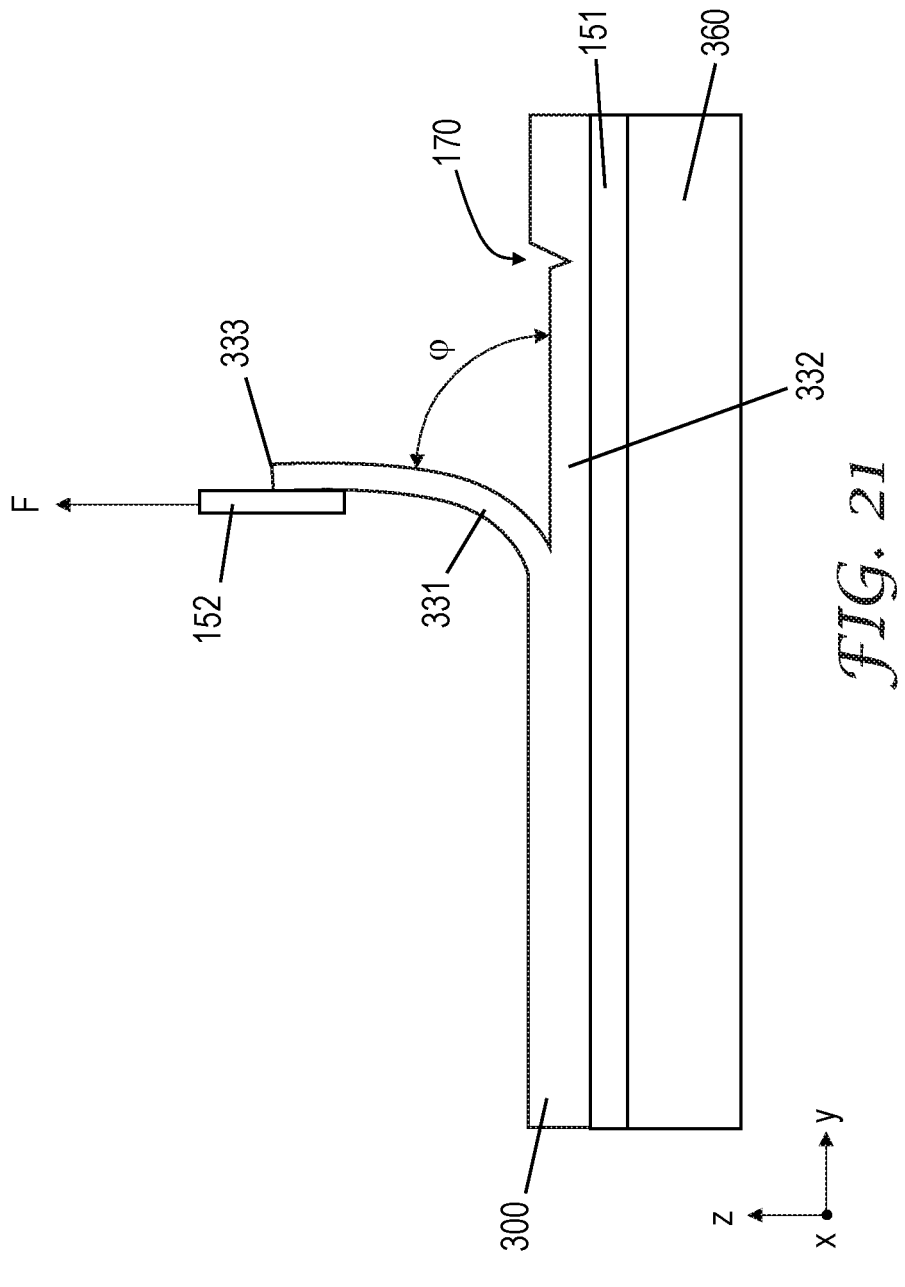
FIG. 21 is a schematic illustration of testing a multilayer optical film for interlayer adhesion.

FIG. 21 is a schematic illustration of testing a multilayer optical film 300 for interlayer adhesion. The multilayer optical film 300 is bonded to a substrate 360 (e.g., a rigid glass substrate) via a double sided tape 151. Then a razor blade, for example, is used to form a cut 170 into the optical film 300. Next, another piece of tape 152 is used to peel an end 333 of a portion 331 of the optical film 300 adjacent the cut 170 from a remaining portion 332 of the optical film 300. The peel force can then be measured by pulling the tape 152 in a direction (z-direction) away from the substrate 360 defining a 90 degree peel angle φ. The peel force per unit width (dimension in the x-direction) of the optical film 300 is the interlayer adhesion. In some embodiments, the peel force is determined using a pull speed (also referred to as crosshead speed) of 12 inches per minute and averaging the measured force over a time of at least about 5 seconds. In some embodiments, the peel force per unit width is the average resistance-to-peel strength determined according to the ASTM D6862-11 (Reapproved 2016) test standard except that a crosshead speed of 12 inches per minute is used. In some embodiments, the interlayer adhesion of the individual layers in the plurality of optical repeat units is at least about 14 grams per inch, or the interlayer adhesion can be in any range described elsewhere herein, where the interlayer adhesion is determined as an average resistance-to-peel strength measured according to the ASTM D6862-11 (Reapproved 2016) test standard except that a crosshead speed of 12 inches per minute is used to pull an upper portion 331 of the multilayer optical film 300 at a 90 degree peel angle from a lower portion 332 of the multilayer optical film 300 while the lower portion 332 is bonded to a substrate 360.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A multilayer optical film comprising a plurality of optical repeat units, the optical repeat units in the plurality of optical repeat units numbering greater than about 10 in total, each of the optical repeat units comprising at least four sequentially arranged first through fourth individual layers, wherein for each of the optical repeat units:

an average thickness of each of the second and fourth individual layers is less than an average thickness of each of the first and third individual layers by at least a factor of 2; and the first and third individual layers have respective f-ratios f1 and f3 for respective indices of refraction nx1 and nx3 in a same in-plane x-direction, such that for a substantially normally incident light polarized along the x-direction, the multilayer optical film has a first order reflection band disposed at wavelengths greater than about 600 nm, the first order reflection band having a first reflection peak having a peak height Rp1, wherein any second order reflection band of the multilayer optical film has a reflection peak having a peak height Rp2 where Rp1/Rp2≥5, and wherein the ratio Rp1/Rp2 remains at least 5 when changing at least one of the f-ratios f1 and f3 continuously by 0.2.

2. The multilayer optical film of claim 1, wherein the second and fourth individual layers have respective indices of refraction nx2 and nx4 along the same in-plane x-direction, nx1<nx2<nx3 and nx1<nx4<nx3.

3. The multilayer optical film of claim 2, wherein 0.44≤f1≤0.55 and 0.02≤f3≤0.55.

4. The multilayer optical film of claim 1, wherein the second and fourth individual layers have respective indices of refraction nx2 and nx4 along the same in-plane x-direction, each of nx2 and nx4 being greater than each of nx1 and nx3.

5. The multilayer optical film of claim 4, wherein 0.45≤f1≤0.8 and 0.02≤f3≤0.4.

6. A multilayer optical film comprising a plurality of optical repeat units, the optical repeat units in the plurality of optical repeat units numbering greater than about 10 in total, each of the optical repeat units comprising at least four sequentially arranged first through fourth individual layers, wherein for each of the optical repeat units:

an average thickness of a same one of the first and third individual layers differs from an average thickness of each other layer of the first through fourth individual layers by at least a factor of 2.5; and the first and third individual layers have respective f-ratios f1 and f3 for respective indices of refraction nx1 and nx3 in a same in-plane x-direction, such that for a substantially normally incident light polarized along the x-direction, the multilayer optical film has a first order reflection band disposed at wavelengths greater than about 600 nm, the first order reflection band having a first reflection peak having a peak height Rp1, wherein any second order reflection band of the multilayer optical film has a reflection peak having a peak height Rp2 where Rp1/Rp2≥5, and wherein the ratio Rp1/Rp2 remains at least 5 when changing at least one of the f-ratios f1 and f3 continuously by 0.2.

7. The multilayer optical film of claim 6, wherein the second and fourth individual layers have respective indices of refraction nx2 and nx4 along the same in-plane x-direction, nx1<nx2<nx3 and nx1<nx4<nx3.

8. The multilayer optical film of claim 7, wherein 0.02≤f1≤0.1 and 0.02≤f3≤0.65.

9. The multilayer optical film of claim 7, wherein 0.44≤f1≤0.55 and 0.02≤f3≤0.55.

10. The multilayer optical film of claim 6, wherein the second and fourth individual layers have respective indices of refraction nx2 and nx4 along the same in-plane x-direction, each of nx2 and nx4 being greater than each of nx1 and nx3.

11. The multilayer optical film of claim 10, wherein 0.45≤f1≤0.8 and 0.02≤f3≤0.4.

* * * * *